United States Patent

Jones et al.

(10) Patent No.: US 6,817,283 B2
(45) Date of Patent: Nov. 16, 2004

(54) HIGH SPEED COOKING DEVICE AND METHOD

(75) Inventors: Douglas S. Jones, New Port Richey, FL (US); William Day, Jr., New Port Richey, FL (US); David Harter, New Port Richey, FL (US); Gerald W. Sank, Palm Harbor, FL (US)

(73) Assignee: Lincoln Foodservice Products, Inc., Fort Wayne, IN (US)

( * ) Notice: Subject to any disclaimer, the term of this patent is extended or adjusted under 35 U.S.C. 154(b) by 0 days.

(21) Appl. No.: 10/167,335

(22) Filed: Jun. 11, 2002

(65) Prior Publication Data

US 2003/0056658 A1 Mar. 27, 2003

Related U.S. Application Data

(63) Continuation-in-part of application No. 09/632,417, filed on Aug. 4, 2000, now Pat. No. 6,595,117.
(60) Provisional application No. 60/147,119, filed on Aug. 4, 1999.

(51) Int. Cl.[7] .............................. A21B 1/00; F24C 15/32
(52) U.S. Cl. .......................... 99/386; 99/401; 99/443 C; 99/447
(58) Field of Search ............................. 99/386, 443 C, 99/447, 401, 331, 389; 126/21 A

(56) References Cited

U.S. PATENT DOCUMENTS

| | | | |
|---|---|---|---|
| 3,736,860 A | 6/1973 | Vischer, Jr. ................... 99/339 |
| 4,556,043 A | 12/1985 | Bratton ...................... 126/21 A |
| 4,591,333 A | * 5/1986 | Henke ....................... 99/386 X |
| 4,739,154 A | 4/1988 | Bharara et al. .............. 219/388 |
| 4,753,215 A | 6/1988 | Kaminski et al. .............. 126/21 |
| 4,873,107 A | 10/1989 | Archer ....................... 426/520 |
| 4,951,648 A | 8/1990 | Shukla et al. .............. 126/21 A |
| 5,077,072 A | 12/1991 | Sieradzki ..................... 426/523 |
| 5,239,917 A | 8/1993 | Lutkie et al. ................. 99/443 |
| 5,253,564 A | * 10/1993 | Rosenbrock et al. ....... 99/386 X |
| 5,983,785 A | 11/1999 | Schreiner et al. ............. 99/386 |
| 6,192,877 B1 | 2/2001 | Moshonas et al. ........ 126/21 A |

FOREIGN PATENT DOCUMENTS

DE          42 39 620        3/1994

* cited by examiner

*Primary Examiner*—Reginald L. Alexander
(74) *Attorney, Agent, or Firm*—Ohlandt, Greeley, Ruggiero & Perle LLP

(57) ABSTRACT

A cooking device that is capable of rapidly cooking food products such as in toasting bread products or cooking pizza. The cooking device uses air impingement from above and/or below the food product. In some cases an infrared heater is additionally used to impart a desired color and crunchiness about a surface of the food product. In some cases, a boost in thermal energy is applied to the bottom of the food product vis-à-vis the top thereof. In some cases, the boost is due to an extra heater, which may be gas or electric. The device is particularly adapted for toasting bread products, cooking sandwich products (toasting the bread and heating the sandwich filler) and/or cooking pizza. Rapid cooking times are achieved by delivering more thermal energy to the top or bottom of the food product, depending on the type thereof, to give quality and speed. For example, a pizza can be cooked to have a crisp bottom without burning a cheese topping.

63 Claims, 19 Drawing Sheets

HIGH SPEED COOKING DEVICE AND METHOD

This Application is a continuation-in-part of U.S. application Ser. No. 09/632,417, filed on Aug. 4, 2000 now U.S. Pat. No. 6,595,117, which claims the benefit of U.S. Provisional Application No. 60/147,119, filed Aug. 4, 1999.

BACKGROUND OF THE INVENTION

1. Field of the Invention

This invention relates to a cooking device and method, and, in particular, to a cooking device and method that is capable of rapidly cooking bread products, such as pizza, muffins, bagels and the like, such that the cooked bread products exhibit a crunchiness. The cooking device is also capable of heating other food products, such as, meats, vegetables and/or garnishes.

2. Description of the Prior Art

In the fast food industry, there is an on going need for faster cooking times for high quality cooking of bread products, such as pizza, muffins, bagels and the like. One type of prior art toaster used in the fast food industry is a contact toaster. An example of a contact toaster is shown in U.S. patent application Ser. No. 09/257,149, filed on Feb. 24, 1999, assigned to the same assignee as this application, now U.S. Pat. No. 5,983,785, granted Nov. 16, 1999. This patent discloses a contact toaster in which a bread product is conveyed by a conveyor belt in pressure contact with a surface of a heated stationary platen. Contact toasters generally toast only one surface of a bread product, such as the surface that is pressured against the heated platen. Such contact toasters require a relatively long time to achieve high quality toasting of a bread product, such as a bagel or muffin. Increasing the speed of the conveyor belt and increasing temperature of the platen may decrease toasting time, but could burn the food product or produce product low in temperature.

An example of a non-contact toaster is the common household toaster that uses two electrical heater elements on either side of a slot that holds the bread product. Non-contact toasters of this type toast the opposed generally flat surfaces of a bread product. Such toasters generally include a rheostat control that allows regulation of the heater element temperature so that the temperature can be increased or decreased depending on the product being toasted. For example, the temperature may be increased to obtain better and faster toasting for a thick bread product, such as a muffin or a bagel. Frequently, the temperature for a desired toasting time is so hot that the bread product burns.

Tunnel ovens that use air impingement heating are known for cooking a broad range of food products, including pizza. An example of a tunnel oven is shown in U.S. Pat. No. 4,873,107. This patent discloses a pair of oppositely rotating conveyor belts arranged to form a gap along a cooking path. Separate heated air manifolds are positioned with each conveyor belt for directed pressurized hot air on the upper and lower surfaces of a pizza item conveyed along the cooking path in the gap. A tunnel oven of this type is capable of cooking a food product at high temperature in a short time without burning. However, there is still a need for tunnel ovens with even faster cooking times. Conventional tunnel ovens do not have any capability to impart crunchiness to the cooked food product.

The tunnel oven of U.S. Pat. No. 4,873,107 uses rectangularly cross-sectioned air jet apertures spaced from one another and from the food items so as to diffuse or plume prior to impingement on the food items. This provides a very even cooking pattern on the food items, thereby tending to prevent streaking on the surfaces thereof. The air jet arrangement allows air flow tuning without disturbing lateral imbalance across the air jet finger by adjustment of fan speed. This tuning, when used with vertical height adjustment of the upper plenum or air jet finger, accommodates food items of varying heights. That is, a manual vertical height adjustment is needed to accommodate food items of different heights.

Thus, there is a need for a tunnel cooking device with even faster cooking times.

There is also a need for a cooking device that can achieve high quality and fast toasting without burning and still provide the crunchiness of a toasted bread product.

There is also a need for a tunnel cooking device with tuning capability to accommodate food items of varying heights without adjustment of the vertical height of the air jet fingers.

The present invention provides a cooking device that meets the aforementioned need for faster toasting/cooking without burning and still providing crunchiness.

The present invention provides a cooking device that heats food products and garnishes.

SUMMARY OF THE INVENTION

A cooking device according to one embodiment of the present invention includes a housing having an inlet and an outlet. A toasting/cooking passageway is defined within the housing. A conveyor assembly moves food products inserted at the inlet along the toasting/cooking passageway. A heated air impingement assembly is arranged to deliver to a top surface of the food product hot air for heating the food product as well as for browning the top surface. An electrical heater is located below the passageway for delivering heat and infrared energy to a bottom surface of the food product. After toasting/cooking, the food products are delivered to the outlet.

The hot air has a temperature that rapidly heats the food product to a toasting temperature in less than 60 seconds. The hot air provides a temperature environment that facilitates the infrared heat to produce a crunchiness effect of the bottom and side surfaces of the food product by the end of the rapid toasting time.

The conveyor assembly has a conveyor belt loop that is spaced from the heated air impingement assembly by a gap. The passageway is located in the gap. Preferably, the air impingement assembly is adjustable by raising and lowering to vary its distance above the food product and thus vary the hot air velocity at the point of impingement.

Preferably, the heated air impingement assembly and the electrical heater assembly can be structured to provide two or more toasting/cooking areas along the passageway so that different toasting/cooking temperatures and air velocities can be employed.

In an alternate embodiment, the conveyor belt assembly has a pair of side by side lower belt loops that form side by side passageways with the air impingement assembly. This allows each passageway to be set for concurrent toasting/cooking of food products of different thickness or height. Alternatively, the passageway gaps can be the same so as to double the toasting/cooking capability of same thickness food products.

In another alternate embodiment heated impingement air is also delivered from below the food product. The electrical heating assembly is disposed relative to columns of the heated impingement air so that there is no substantial interference between the infrared energy and the impingement air.

In still another embodiment of the cooking device of the present invention, thermal energy is delivered to a top and a bottom of a food product such that the thermal energy delivered to one of the top and bottom is greater than that delivered to the other. The thermal energy is delivered at least in part by an air impingement assembly that provides upper columns of air to the top and lower columns of air to the bottom.

The delivery mechanism comprises a means for heating the air that forms the upper and lower columns of air and a first heater disposed between the means for heating and the bottom of the food product. Preferably, the first heater is disposed between the air impingement assembly and the bottom. The first heater preferably includes a heater element that is disposed to weave about the lower columns of heated air without being directly within the first columns of air. The air impingement assembly preferably includes a surface with a plurality of apertures through which the lower columns of heated air are delivered, and the heater element does not overlie any of the apertures.

In alternate embodiments, the first heater is disposed inside the air impingement assembly. The first heater element may be disposed to weave about jet apertures that form the lower columns of heated air so as to provide minimal interference therewith. Alternatively, the heater element may be disposed in the lower plenum nearer to a fan assembly.

According to another embodiment of the present invention, the cooking device also comprises an oven cavity and a heating chamber. The air impingement assembly is at least partly disposed in the oven cavity, and the first heater is disposed in the heating chamber. The means for delivering preferably provides a circulating air stream that is heated by the heating means. The circulating air stream is divided into a first path that includes the lower columns of air and into a second path that includes the upper columns of air. The first heater boosts the temperature of the circulating air stream in the first path above the temperature of the circulating air stream in the second path.

Preferably, the first heater is located either between the air impingement assembly and the bottom of the food product, inside the air impingement assembly or between the air impingement assembly and the heating means.

The means for delivering also comprises a fan assembly disposed in the circulating air stream and the first heater is disposed in the fan assembly. The means for delivering also preferably comprises a divider that divides the circulating air stream into the first and second paths. The first heater is disposed relative to the divider to boost the temperature of the circulating air stream in the first path. The first heater is disposed either in the first path or in the divider, in which case the divider includes a heat transfer communication, such as one or more louvers, with the first path. The first heater may be either a gas heater or an electrical heater.

In the various embodiments, the cooking device may alternatively or additionally comprise means for cooling the air that forms the upper columns of air. Thus, delivery means comprises means for altering the temperature of the lower or upper columns of air. According to one aspect of this embodiment, the means for altering either boosts the temperature of the lower columns of air, cools the temperature of the upper columns of air or both.

The method of the present invention cooks a food product by providing a stream of heated air that is applied as columns of heated air to the top of the food product. Also, heat is provided to the bottom of the food product. The thermal energy applied to the top and bottom of the food product is controlled so that the thermal energy applied to the bottom is greater than that applied to the top.

Preferably, infrared energy is also applied to the bottom of the food product. Alternatively, or additionally, a portion of the stream of heated air is cooled for use in forming the upper columns of air. Preferably, the heated air stream is controlled so that the lower columns of air are warmer than the upper columns of air.

A further embodiment of the cooking device of the present invention comprises a means that includes a plurality of jet apertures for providing columns of impingement air. The columns of impingement air form a blanket of impingement air for cooking food products of different heights without adjustment of the distance between the jet apertures and the food products. The cooking device is capable of cooking the food products of different heights in substantially identical cooking times.

Preferably, the jet apertures have a cross-section that is shaped to provide different BTU delivery rates for cooking the food products of different heights. The cross-section preferably has at least one elongated member with one or more enlarged portions located at an end, a center or a combination thereof. The cross section is preferably selected from the group consisting of: dog bone, jack and starburst.

In an alternate embodiment, the columns of impingement air are directed toward the food products from a direction above, below or above and below the food products. The impingement columns preferably include upper columns and lower columns of impingement air that are directed toward the food products from above and below. A conveyor is preferably provided to move the food products through the blanket of impingement air.

In an alternate embodiment, a control means is provided to control the thermal energy applied to a top and a bottom of the food products with a capability of applying a balanced or unbalanced thermal energy thereto. Preferably, a greater thermal energy is applied to either the top or bottom of the food products than to the other.

In another alternate embodiment, one or more radiant heaters are disposed to provide heat to the food products. One of the radiant heaters is disposed above or below a top or a bottom of the food products and the columns of impingement air are directed to the other thereof. Alternatively, first and second ones of the radiant heaters are disposed above or below the top and bottom sides of the food products. Preferably, a control means is provided to selectively control the on/off states thereof by selecting a state from the group consisting of: both on, both off and one on and the other off.

In a further embodiment of the method of the present invention, food products of different heights are cooked by providing columns of impingement air via jet apertures that form a blanket of impingement air. The blanket of impingement air cooks the food products of different heights without adjustment of the distance between the jet apertures and the food products. The method is capable of cooking the food products of different heights in substantially identical cooking times.

Preferably, the jet apertures have a cross-section that is shaped to provide different BTU delivery rates for cooking the food products of different heights. The cross-section preferably has at least one elongated member with one or more enlarged portions located at an end, a center or a combination thereof. The cross section is preferably selected from the group consisting of: dog bone, jack and starburst.

The columns of impingement air are directed toward the food products from a direction above, below or above and below the food products.

In another embodiment of the method, the thermal energy is controllably applied to a top and a bottom of the food products with a capability of applying a balanced or unbalanced thermal energy thereto.

BRIEF DESCRIPTION OF THE DRAWINGS

Other and further objects, advantages and features of the present invention will be understood by reference to the following specification in conjunction with the accompanying drawings, in which like reference characters denote like elements of structure and.

DESCRIPTION OF THE INVENTION

Figure 1:
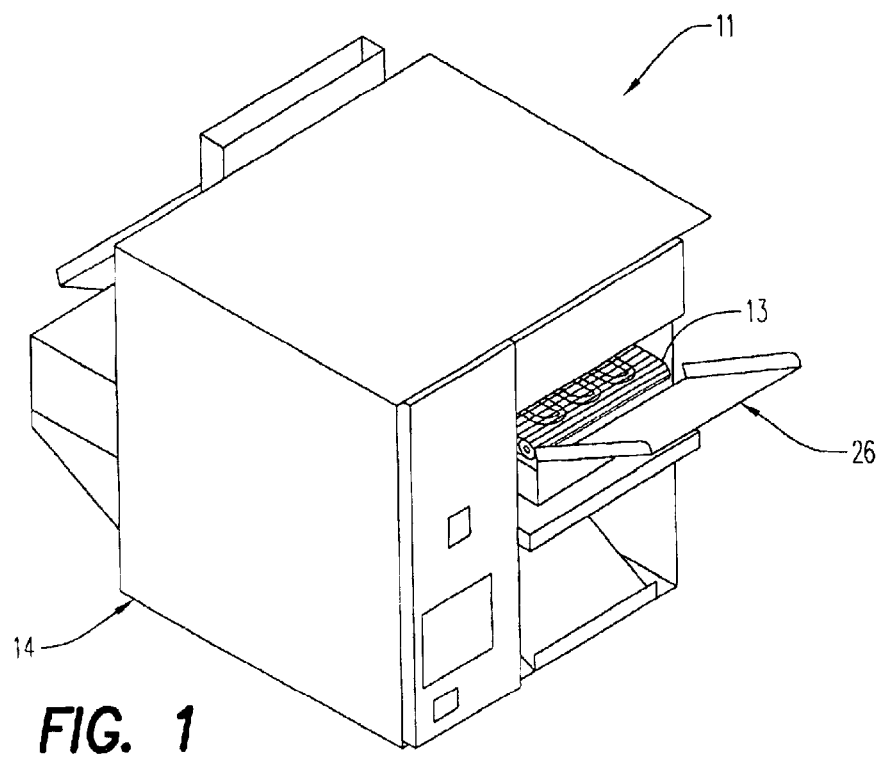
FIG. 1 is a perspective view from the food inlet side of a high speed cooking device according to the present invention.
Figure 2:
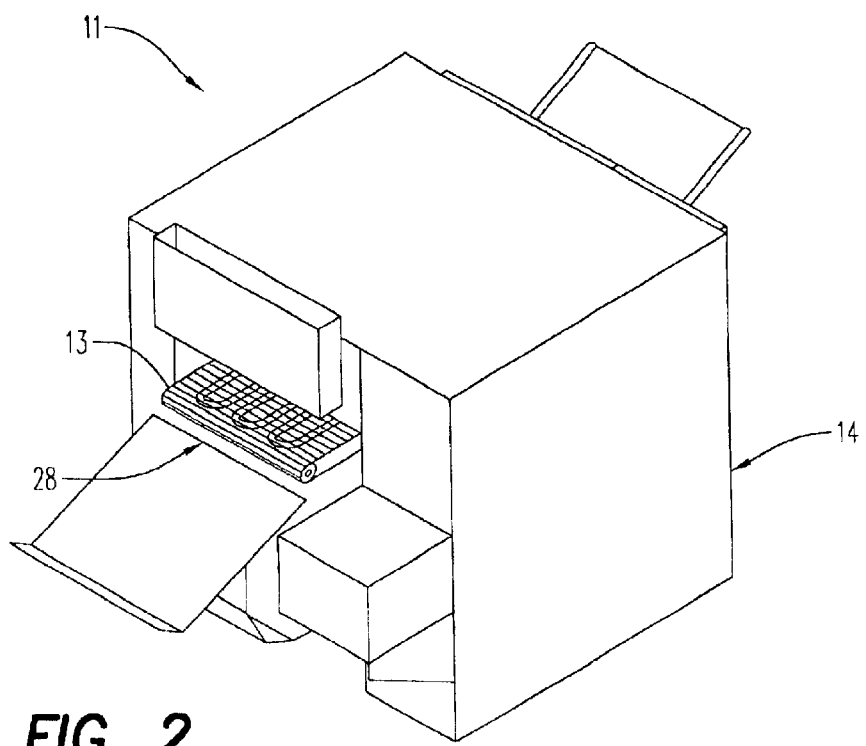
FIG. 2 is a perspective view from the food outlet side of the FIG. 1 cooking device.
Figure 3:
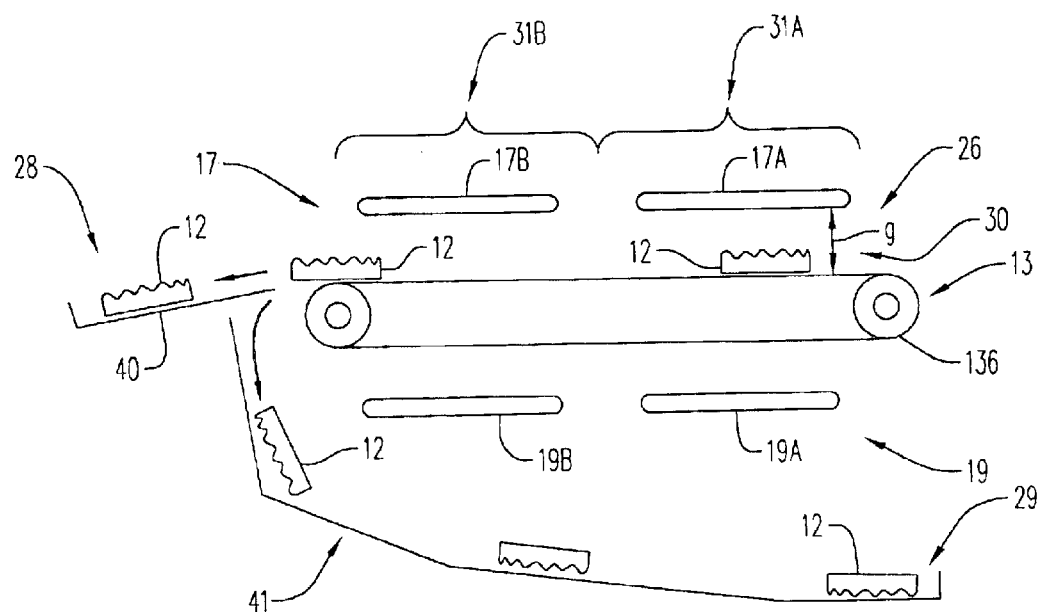
FIG. 3 is a skeletal view in elevation of the conveyor belt assembly and heating elements of the FIG. 1 cooking device.

With reference to FIGS. 1 through 3, there is provided a high speed cooking device 11 according to a preferred embodiment of the present invention. High speed cooking device 11 includes a housing 14, a conveyor assembly 13, an air impingement assembly 17 and a heater assembly 19, such as an electrical heater assembly or an air impingement assembly. By way of example, heater assembly 19 is shown as an electrical heater assembly.

Housing 14 includes an inlet 26, an outlet 28 and an outlet 29. A food product 12 enters cooking device 11 via inlet 26 and is conveyed by conveyor assembly 13 to either outlet 28 or outlet 29 along a toasting/cooking passageway 30. Conveyor assembly 13 includes a conveyor belt loop 136 that rotates in the direction illustrated by the arrow in FIG. 3 to convey food products 12 along toasting/cooking passageway 30 from right to left. Food products 12 are deposited by gravity at the left end of conveyor belt loop 136 onto either a pass through chute 40 that leads to outlet 28 or onto a return chute 42 that leads to outlet 29. Pass through chute 40 is used when it is desired to have food products 12 exit via outlet 28. When it is desired to exit food products via outlet 29, pass through chute 40 is either removed or moved to a position that allows food products 12 to enter return chute 41.

Toasting/cooking passageway 30 is divided into a first toasting/cooking area 31A and a second toasting/cooking area 31B. Air impingement assembly 17 is located above conveyor belt loop 136 and has a first air impingement heater 17A and a second air impingement heater 17B. Conveyor belt loop 136 and air impingement assembly 17 are separated by a gap 'g'. Toasting/cooking passageway 30 is located in gap 'g'. Electrical heater assembly 19 has a first electrical heater element 19A and a second electrical heater element 19B located below belt loop 136 in toasting/cooking areas 31A and 31B.

An important feature of the present invention is the use of air impingement heating to rapidly heat food products 12, such as bread, to a toasted temperature that corresponds to a desired temperature specified by the user of the cooking device 11, while browning an upper surface of food products 12. For toasting bread products, the temperature of the impingement air is in the range of about 500° F. to 700° F. Most preferably, the temperature of the impingement air is about 600° F. to achieve a toasting time of less than 60 seconds.

To give a crunchiness to food product 12, electrical heaters 19A and 19B are operated at a temperature that produces infrared radiation to be incident on the lower surface and side surface of food product 12. It has been observed that for the environment created by the above noted air impingement temperatures, crunchiness is achieved by the end of the toasting time with infrared heating temperatures in the range of about 1,000° F. to 1,800° F.

The division of toasting/cooking passageway 30 into separate toasting/cooking areas allows the flexibility of using the same or different toasting/cooking temperatures in toasting/cooking areas 31A and 31B. For example, if food product 12 is frozen or cooled, the temperature of toasting/cooking area 31A can be set high to rapidly thaw and bring food product 12 to a warm but not toasted temperature during its traverse of zone 31A. The temperature of zone 31B can be set somewhat lower to finish heating food product 12. On the other hand, some applications may use substantially equal temperatures in zones 31A and 31B.

Figure 4:
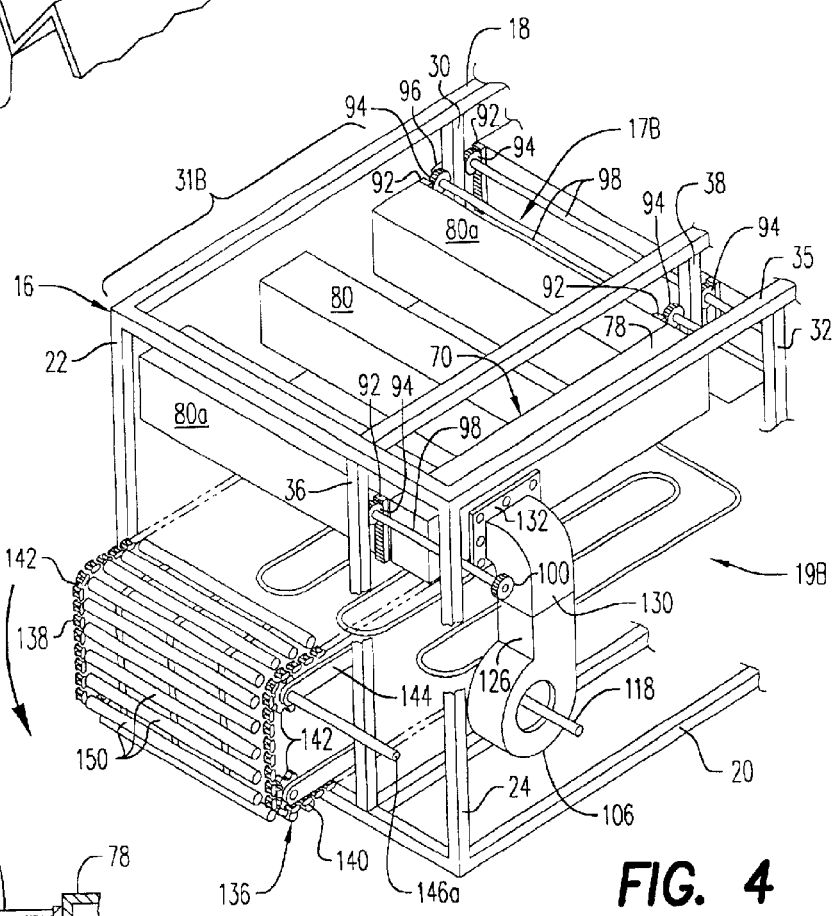
FIG. 4 is a partial view of the conveyor assembly and heating elements for the FIG. 1 cooking device.

Referring to FIG. 4, housing 14 also includes an internal framing structure 16 of which only a portion is shown that corresponds to toasting/cooking area 31B. Internal framing structure 16 includes upper and lower horizontally extending rectangular frame portions 18 and 20 that are vertically spaced apart by vertically extending frame elements 22, 24, 30 and 32. A vertically disposed rectangular frame portion 36 is located within and secured at its corners to upper and lower rectangular frame portions 18 and 20. An intermediate vertically extending frame element 38 is also secured to rectangular frame portion 36. Internal framing structure is secured to the exterior walls of housing 14 in any suitable manner.

Air impingement heater 17B includes a supply duct assembly or plenum 70 that is positioned slightly above outlet 28. Supply duct assembly 70 includes an inlet or base portion 78 that is positioned generally between the housing vertical frame portion 36 and a vertical frame portion 35 of the rectangular frame formed by frame portions 18 and 20. Base portion 78 extends parallel to the toasting/cooking passageway. Supply duct assembly 70 also includes three supply ducts or jet fingers 80 joined to base portion 78 for ducting air supplied via base portion 78. Base portion 78 and jet fingers 80 have generally rectangular cross-sections.

Figure 5:
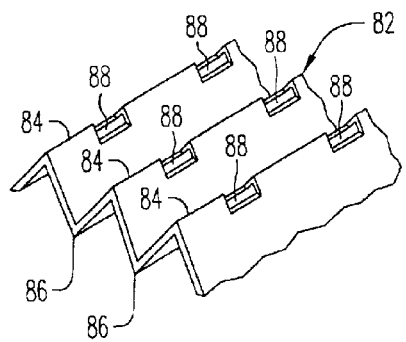
FIG. 5 is an enlarged fragmentary perspective view of one of the jet curtain plates through which heated impingement air flows against food items traversing the interior of the FIG. 1 cooking device.

Referring to FIG. 5, each of the jet fingers 80 has a bottom surface 82 that faces passageway 28. Each of the bottom surfaces 82 has, along its length, a corrugated cross-section defined by alternating series of generally V-shaped ridges 84 and 86 that extend parallel to the lengths of jet fingers 80. Ridges 84 project downwardly toward passageway 28. A plurality of generally rectangular shaped air slot openings 88 are formed in the apex of each ridge 84.

Figure 6:
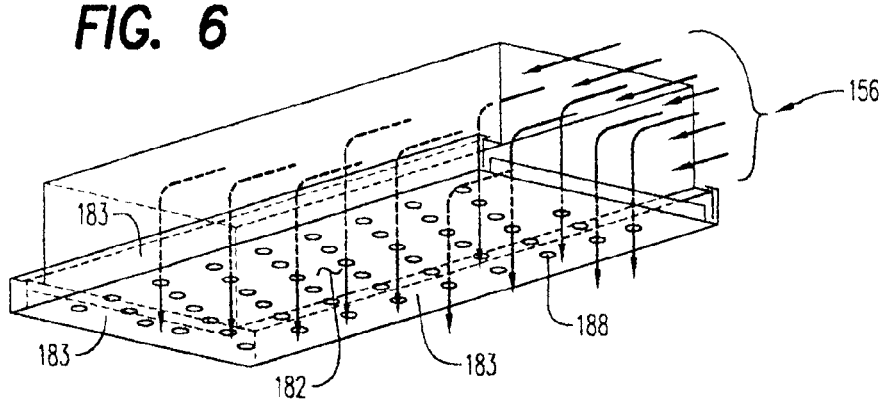
FIG. 6 is a perspective view of an alternate embodiment of the jet curtain plate.
Figure 7:
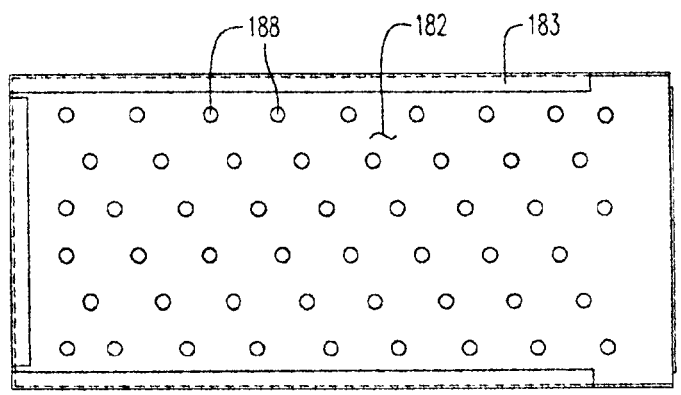
FIG. 7 is a plan view of the jet curtain plate of FIG. 6.

Referring to FIGS. 6 and 7, each of the jet fingers 80 in an alternate embodiment has a generally flat bottom surface 182 with a plurality of side wall tabs 183 for attachment to a jet finger 80. A plurality of generally circular apertures 188 is formed in bottom surface 182 to direct air 156 as impingement air toward food products 12 (not shown in FIGS. 6 and 7). Apertures 188 are arranged in an array that includes diagonal rows of apertures 188.

Figure 8:
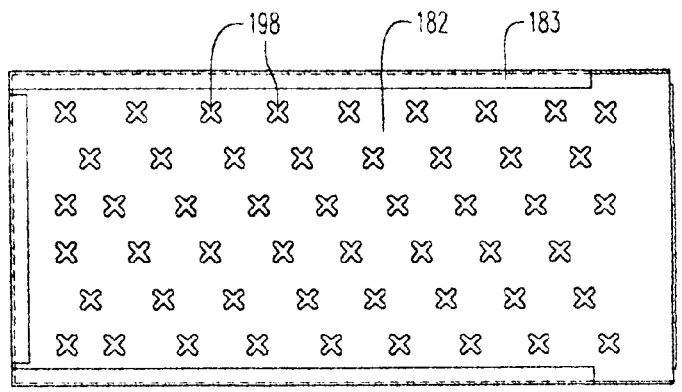
FIG. 8 is a plan view of another alternate embodiment of the jet curtain plate.

Referring to FIG. 8, bottom surface 182 has formed therein a plurality of multiple point shaped apertures 198 that have three or more points according to another alternate embodiment of the invention. Preferably, apertures 198 have four points or a cruciform shape as shown in FIG. 8. Preferably, apertures 198 are formed, as by a punch operation, such that the cruciform points extend generally downward from bottom surface 182 toward food products 12. This configuration has been found to give improved air impingement flow.

Duct assembly 70 is supported within housing 14 for selective vertical movement relative thereto by a pair of rack members 92. Rack members 92 are secured to the outer jet finger 80a and a pair of cooperating pinion gears 94 that are operatively mounted on vertical frame elements 22, 30, 36 and 38 by suitable support brackets 96. Pinion gears 94 for each jet finger 80a are operatively connected by elongated drive shafts 98 that extend parallel to jet fingers 80a. Drive shafts 98 are rotated to selectively raise or lower duct assembly 70 to thereby selectively change the gap 'g'. Alternatively, conveyor belt assembly 13 can be raised or lowered to change the gap 'g'.

Figure 9:
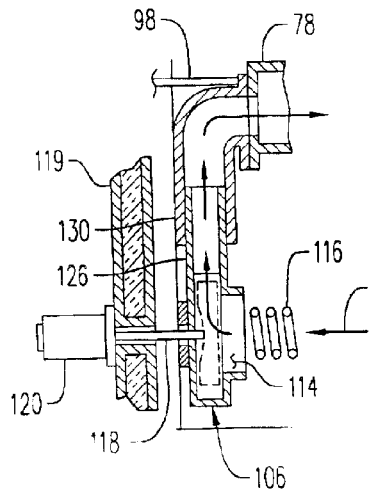
FIG. 9 is a fragmentary cross-sectional view of the fan of FIG. 4.

Referring to FIGS. 4 and 9, heated cooking air from within housing 14 is supplied to plenum duct assembly 70 by a fan 106 mounted within housing 14. Fan 106 has an opening 114 that faces the interior of housing 14, an electrical heating coil 116, a drive shaft 118 extending outwardly through an adjacent wall 119 of housing 14 and a motor 120, suitably secured to wall 119. An outlet duct 126 extends vertically from fan 106 and is slidably and telescopically received in a supply duct section 130 that in turn is secured to base portion duct 78 by mounting bracket 132. This construction allows duct assembly 70 to freely move vertically when drive shafts 98 are rotated. Electrical heating coil 116 serves to heat air 156. Heating coil 116 may be located downstream of fan opening 114 as shown in FIG. 9 or in any other position that heats air 156.

Conveyor belt loop 136 includes a pair of looped roller chains 138 and 140 that extend transversely to jet fingers 80 and 80a. Outer end portions of conveyor belt loop 136 are rotatably supported at corner portions thereof by suitable sprockets 142 that operatively engage roller chains 138 and 140. Sprockets 142 are secured to housing 14 by mounting brackets 144.

Laterally opposed sprockets 142 are interconnected by suitable connecting rods 146. At least one connecting rod 146 is rearwardly extended to define a drive shaft 146a. Drive shaft 146a may suitably be driven (by a conventional drive, not shown) to rotate belt loop 136 in the direction indicated by the arrow to horizontally convey food product 12 along passageway 30 (FIG. 3).

Conveyor belt loop 136 includes a series of individual transverse sections 150 that are operatively secured between roller chains 138 and 140 for movement therewith.

Referring to FIGS. 3 through 9, supply fan 106 draws air 156 (FIG. 9) from within housing 14 into opening 114 across heating element 116. Heated air entering fan 106 is forced upwardly into base duct portion 78 and through jet fingers 80 and 80a and then exits via air slots 88 downwardly toward passageway 30. The rectangularly cross-sectioned jets of hot air impinge upon conveyor belt loop 136 and upon food products 12 in passageway 30 to thereby heat food product 12 and brown its upper surface. After impinging on food product 12, the air continues in a recirculating path to fan opening 114 via heating element 116.

Electrical heater 19B is shown in FIG. 4 as an electrical heating coil that has a serpentine coil pattern, although any shape or type of infrared heating element capable of imparting the desired crunchiness to the food product is also contemplated by the present invention. Electrical heaters 19A and 19B may be separate coils with separate temperature regulators or may be a combined coil that extends across both toasting/cooking areas 31A and 31B with one temperature regulator. As previously mentioned, electrical heaters 19A and 19B are heated to a temperature that produces infrared radiation. The infrared radiation acts in the heated environment produced by hot air impingement assembly 17 to toast the bottom and side surfaces of food product 12 to the desired crunchiness.

Figure 10:
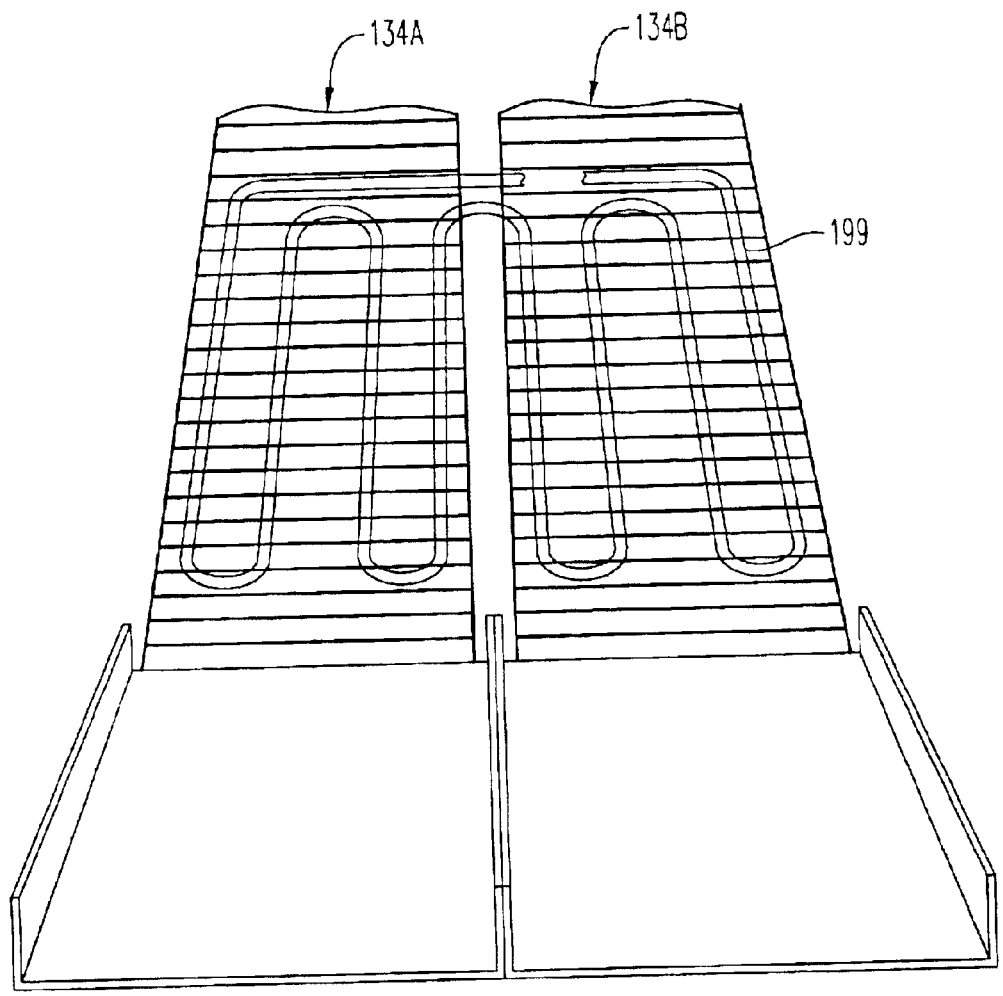
FIG. 10 is a perspective view of an alternate embodiment that has twin conveyor belts.

Referring to FIG. 10, an alternate embodiment of the present invention has a pair of conveyor belt loops 134A and 134B. Each lower belt loop 134A and 134B is situated beneath upper belt loop 136 to form separate toasting/cooking passageways for the conveyance of food products 12. A single heater coil 199 is used for both lower belt loops 134A and 134B. The gap 'g' of each passageway may be separately adjusted so that food products of the same or different thickness can be concurrently cooked or toasted. For example, both passageways can be set to the same gap so as to double the number of food items of the same thickness that can be cooked or toasted. Alternatively, one passageway can be set to a gap 'g' that accommodates the heel of a muffin and the other to a gap 'g' that accommodates the crown of a muffin. Additionally, air impingement assembly 17 can be extended to cover both passageways in each toasting/cooking area. Alternatively, separate air impingement assemblies can be used for each passageway and toasting/cooking area.

The distance between electrical heating assembly 19 and conveyor belt loop 136 may be adjustable to vary the intensity of the heat and infrared energy incident on the food products 12. In some embodiments, heating assembly 19 may be located within conveyor belt loop 136.

In still other embodiments of the present invention, air impingement assembly 17 can be located in other positions that can deliver impingement air to food products 12. For example, air impingement assembly 17 can be located anywhere in housing 14 with an impingement air delivery ductwork that provides impingement air to food products 12.

In some embodiments, conveyor belt assembly 13 may be vertically adjustable to vary the gap "g".

Figure 11:
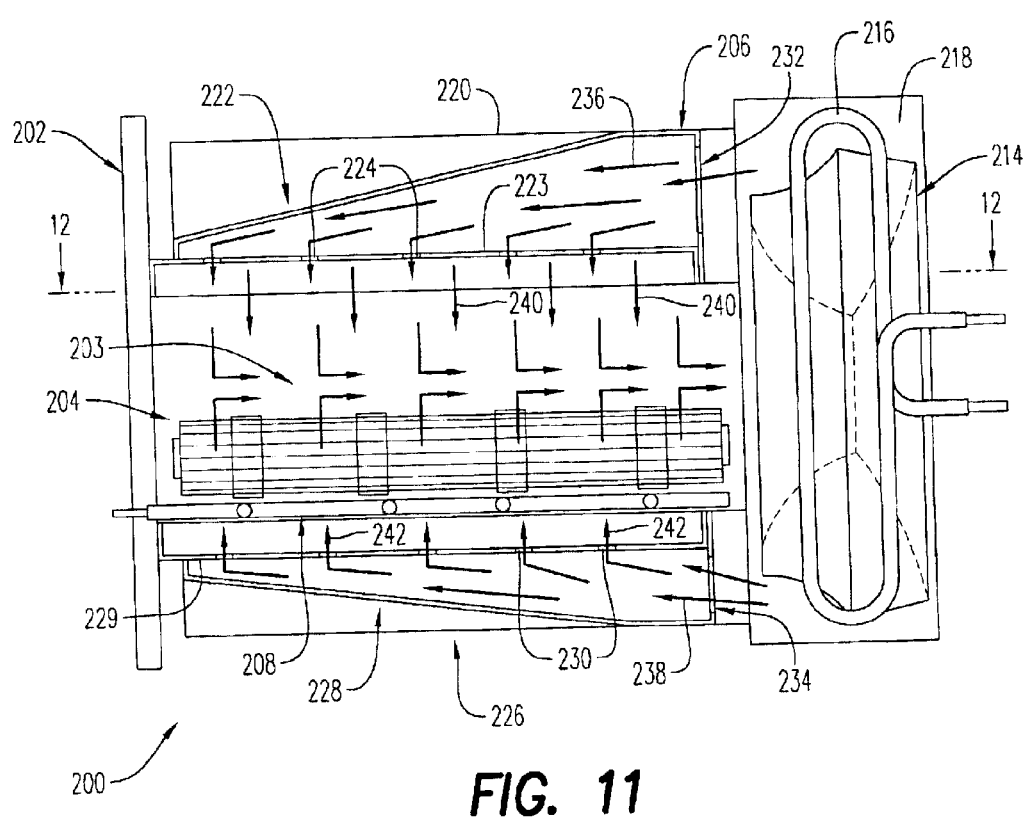
FIG. 11 is a front view with front cover removed of an alternate embodiment of the high speed cooking device of the present invention.
Figure 12:
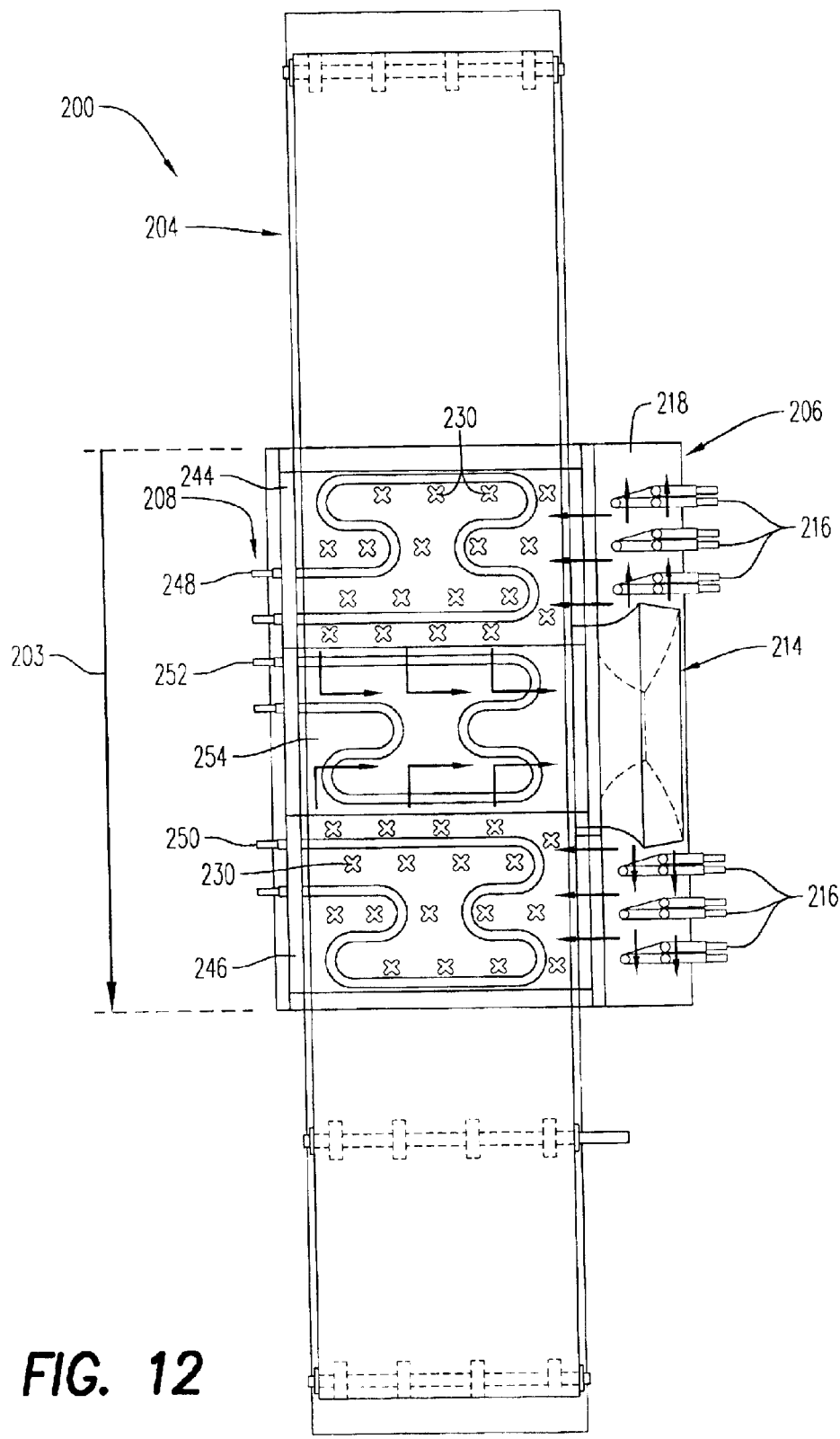
FIG. 12 is a view taken along line 12—12 of FIG. 11.

Referring to FIGS. 11 and 12, an alternate embodiment of the present invention is shown as a high speed cooking device 200. High speed cooking device 200 includes a housing 202, a conveyor assembly 204, an air impingement assembly 206 and an electrical heater assembly 208. Housing 202 defines a toasting/cooking passageway 203 located above conveyor assembly 204. Conveyor assembly 204 rotates to convey food products (not shown) on one or more conveyor belts (not shown) along toasting/cooking path 203. Air impingement assembly 206 includes an upper air plenum 220, a lower air plenum 226, a fan 214, air heaters 216 and an air plenum 218. Upper air plenum 220 has a distribution ramp 222, a bottom surface 223 and a plurality of apertures 224 formed in bottom surface 223. Lower air plenum 226 that has a distribution ramp 228, a top surface 229 and a plurality of apertures 230 formed in top surface 229.

When fan 214 rotates, an airflow is generated in air plenum 218 that is heated by air heaters 216. The heated air flows from air plenum 218 via a slot 232 into upper air plenum 220 and a slot 234 into lower air plenum 226 as indicated by arrows 236 and 238, respectively. The heated airflow in upper air plenum 218 is deflected by ramp 222 to flow downwardly through apertures 224 as indicated by arrows 240 toward the top of conveyor assembly 204 and into toasting/cooking passageway 203. The heated airflow in lower air plenum 226 is deflected upwardly by ramp 228 through apertures 230 as indicated by arrows 242 toward the bottom of and through conveyor assembly 204 into toasting/cooking passageway 203.

Upper air plenum 218 may suitably be a single jet finger that has a length substantially along toasting/cooking passageway 203. Alternatively, upper air plenum 218 may be a plurality of jet fingers. Preferably, apertures 224 have a cruciform shape.

Referring to FIG. 12, lower air plenum 226 has a jet finger 244 located at one end of toasting/cooking passageway 203 and another jet finger 246 located at the other end of toasting/cooking passageway 203. Apertures 230 are disposed in the tops of jet fingers 244 and 246 and preferably have a cruciform shape.

Electrical heater 208 includes a heater element 248 disposed above jet finger 244, a heater element 250 disposed above jet finger 246 and a heater element 252 disposed above a space 254 located between jet fingers 244 and 246. Heater elements 248, 250 and 252 are infrared heaters that are each formed in a serpentine pattern. The serpentine patterns of heater elements 248 and 250 are arranged to wind about apertures 230, but to avoid overlying apertures 230. This arrangement permits infrared energy emitted by heater elements 248 and 250 and convection energy of air impingement columns flowing upwardly from apertures 230 to have minimal interference with one another. That is, the heater elements do not impede the air flow and the air flow does not reduce the infrared emissions by cooling the heating elements.

Cooking device 200 provides a cooking environment that is extremely hot from above and below toasting/cooking passageway 203, while gaining the benefit of added crunchiness afforded by infrared heating assembly 208. By using three different heater elements 248, 250 and 252 and spaced lower jet fingers 244 and 246, three distinct cooking zones are defined that can be controlled for heating temperatures and food product resident times within each zone. This affords great flexibility in the toasting/cooking process.

Figure 13:
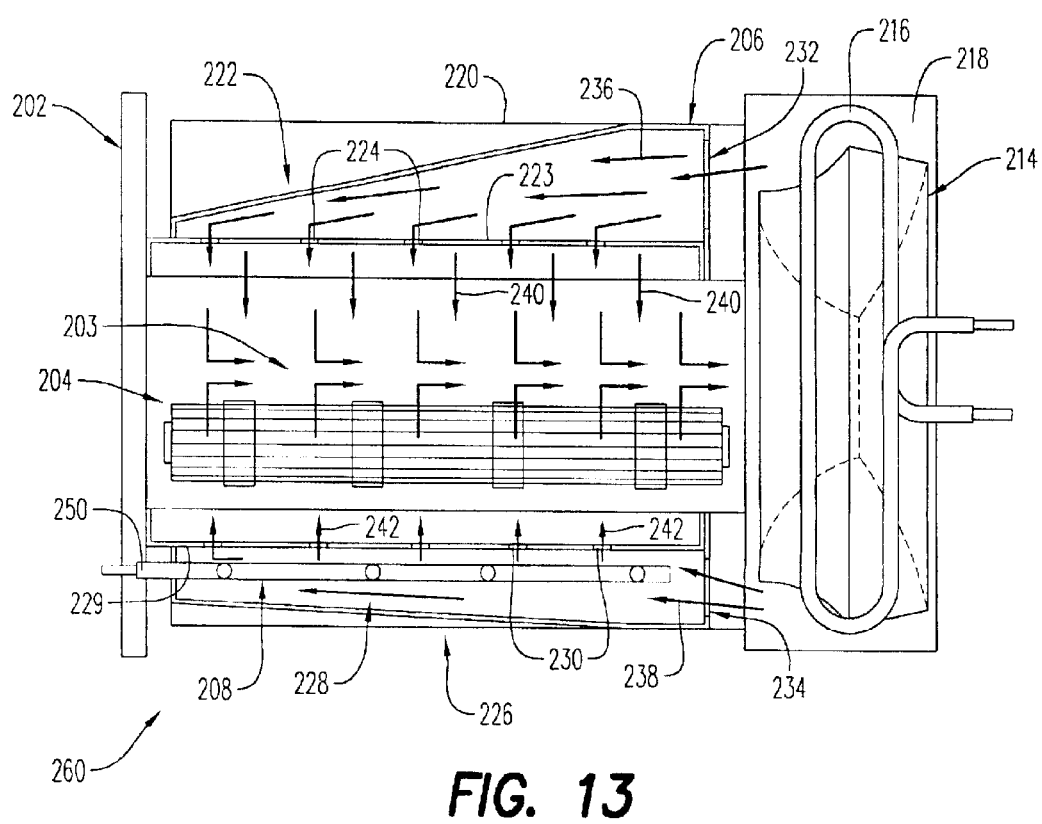
FIG. 13 is a front view with front cover removed of another alternate embodiment of the high speed cooking device of the present invention.

Referring to FIG. 13, an alternate embodiment of the invention is shown as a cooking device 260. Cooking device 260 is similar to cooking device 200 of FIGS. 11 and 12 and like components thereof bear like reference characters. Cooking device 260 differs from cooking device 200 in that electrical heater 208 is disposed within lower air plenum 226. Thus, heater element 250 is disposed in jet finger 246 as shown in FIG. 13. Though not shown in FIG. 13, heater element 248 is disposed in jet finger 244 (see FIG. 12). It will be appreciated by those of ordinary skill in the art that cooking device 200 and cooking device 260 may or may not need to use heater element 252 (see FIG. 12) based on the spacing between jet fingers 244 and 246. Like cooking devices 11 and 200, cooking device 260 provides heat to the top and the bottom of a food product such that the heat applied to the bottom is greater in thermal energy (hotter) so as to cook the food products more rapidly. Heater elements 208, 248 (not shown in FIG. 13) and 250 may be any suitable heating element that boosts the temperature of the lower impingement air relative to the upper impingement air. By way of example, heater elements 248 and 250 may be infrared heater elements.

Figure 14:
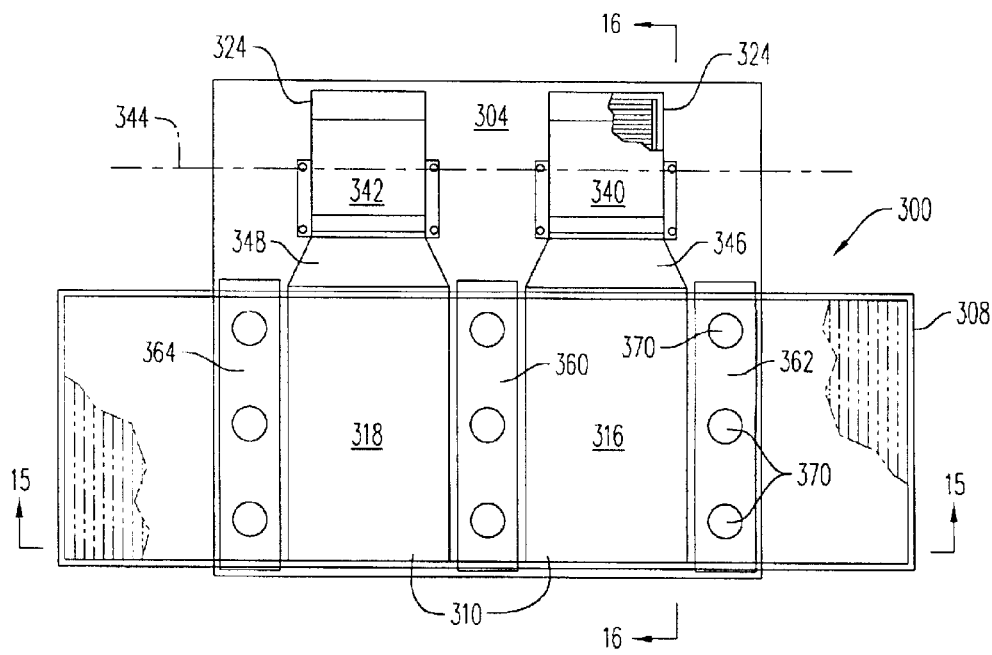
FIG. 14 is a top view of another alternate embodiment of the high speed cooking device with top cover removed of the present invention.
Figure 15:
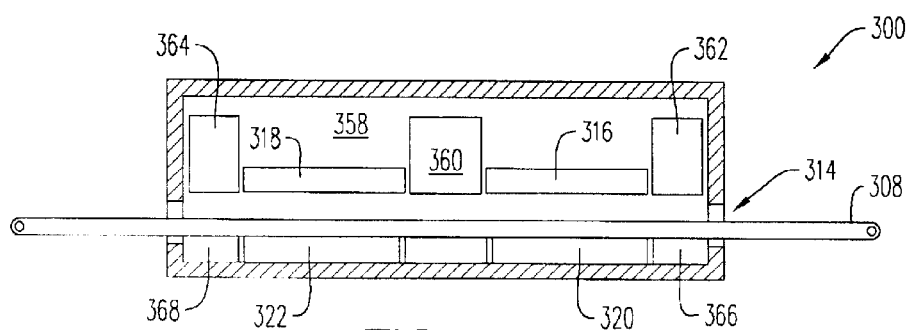
FIG. 15 is a view taken along line 15 of FIG. 14.
Figure 16:
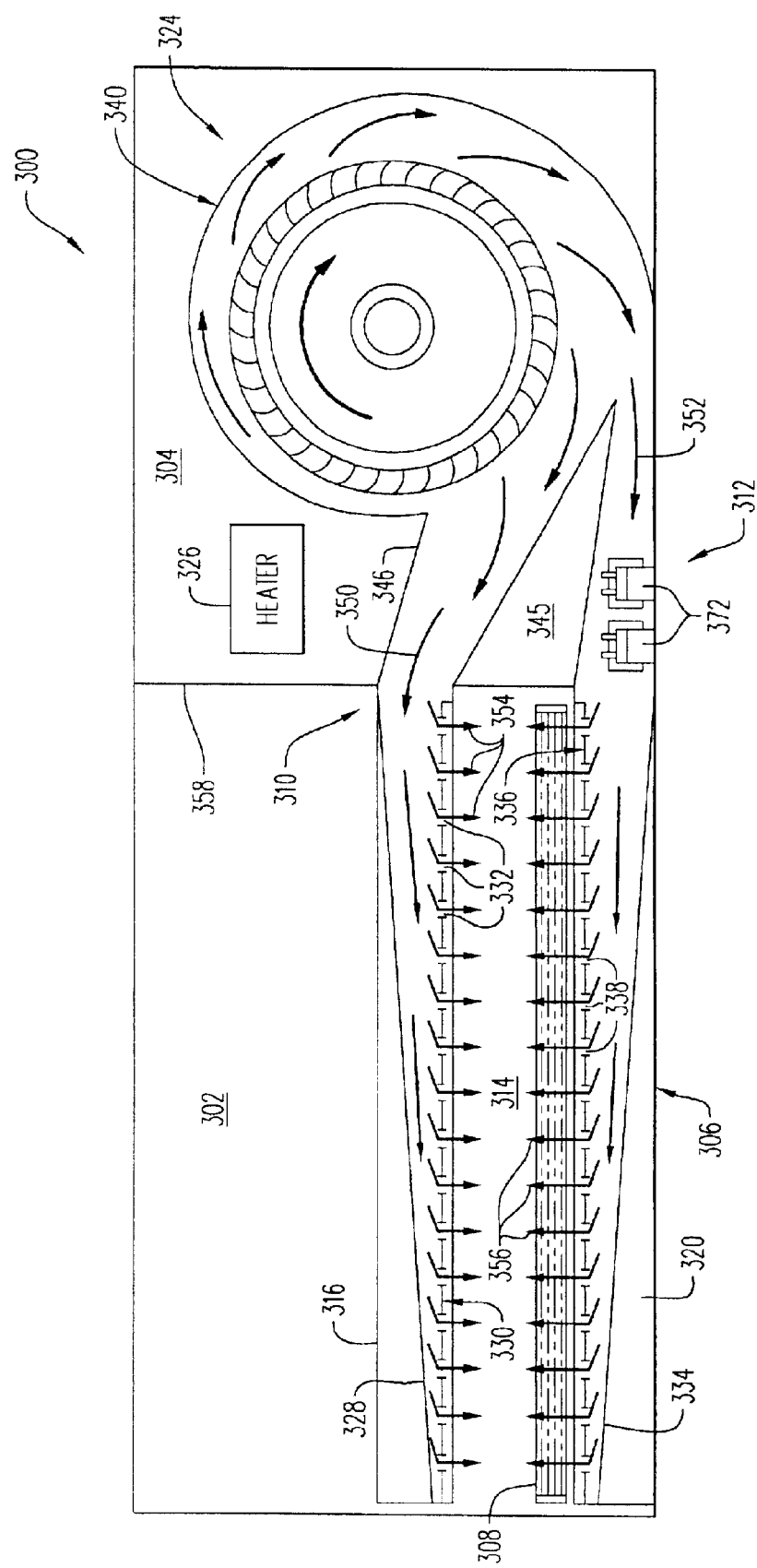
FIG. 16 is a view taken along line 16 of FIG. 14.

Referring to FIGS. 14–16, an alternate embodiment of the present invention is shown as a cooking device 300. Cooking device 300 includes an oven cavity 302 and a heating chamber 304 disposed in a housing 306. A conveyor assembly 308 is disposed in oven cavity 302. An air impingement assembly 312 is disposed partly in oven cavity 302 and partly in heating chamber 304. A cooking passageway 314 is located above conveyor assembly 308. Conveyor assembly 308 rotates to convey food products (not shown) on one or more conveyor belts (not shown) along cooking passageway 314.

Air impingement assembly 310 includes a pair of upper air plenums 316 and 318, a pair of lower air plenums 320 and 322, a fan assembly 324, an air heater assembly 326 and an air plenum 318. Upper air plenums 316 and 318 are substantially identical. For example, upper air plenum 316 has a distribution ramp 322, a bottom surface 323 and a plurality of apertures 324 formed in bottom surface 323. Although only three apertures 332 are shown in FIG. 16, it will be appreciated that there are many more apertures 332 distributed across most of bottom surface 330.

Lower air plenums 320 and 322 are substantially identical. For example, lower air plenum 320 has a distribution ramp 334, a top surface 336 and a plurality of apertures 338 formed in top surface 336. Although only three apertures 338 are shown in FIG. 16, it will be appreciated that there are many more apertures 338 distributed across most of top surface 336. Alternatively, a single upper air plenum extending along the length of passageway 314 could be used in place of upper air plenums 316 and 318 and/or a single a single lower air plenum could be used in place of lower air plenums 320 and 322.

Fan assembly 324 and air heater assembly 326 are disposed within heating chamber 304. Fan assembly 324 includes a pair of centrifugal fans 340 and 342 mounted on an axis 344 and disposed in separate fan housings 346 and 348. Axis 344 is parallel to the direction of travel of the food product along conveyor assembly 308. Fan housing 346 is in fluid communication with upper plenum 316 and lower plenum 320. Fan housing 348 is in fluid communication with upper plenum 318 and lower plenum 322. An air stream divider 345 penetrates into fan housing 346 to divide a circulating air stream developed by fans 340 and 342.

Air heater assembly 326 may include any suitable heating element or elements, such as gas or electric elements, and is positioned at a suitable location in heating chamber 304 to heat the circulating air stream.

When fans 340 and 342 rotate, a heated air stream is developed in fan housings 346 and 348. The heated air stream is divided by divider 345 into upper air plenums 316 and 318 and into lower air plenums 320 and 322. In FIG. 16, this air stream is indicated by arrows 350 and 352 for upper plenum 316 and lower plenum 320, respectively. The heated air stream in upper air plenum 316 is deflected by distribution ramp 328 to flow downwardly through apertures 330 as indicated by arrows 354 toward the top of conveyor assembly 308 and into toasting/cooking passageway 314. The heated air stream in lower air plenum 320 is deflected upwardly by ramp 334 through apertures 338 as indicated by arrows 356 toward the bottom of and through conveyor assembly 308 into toasting/cooking passageway 314.

Housing 306 includes a wall 358 that separates oven cavity 302 from heating chamber 304. A plurality of air return ducts 360, 362, 364, 366 and 368 are connected with wall 358 to provide fluid communication between passageway 314 and fan housing 346. Air return ducts 360, 362 and 364 are disposed above conveyor assembly 308 within passageway 314 and air return ducts 366 and 368 are disposed below conveyor assembly 308 within passageway 314. Each of the air return ducts 360, 362, 364, 366 and 368 includes a plurality of openings for the circulating air stream to return to fan housing 346. For example, air return duct 362 includes openings 370 disposed on a bottom surface thereof that faces conveyor assembly 308. After impingement upon the food product (not shown in FIGS. 14-15), the heated air flow returns to heating chamber 304 via air return ducts 360, 362, 364, 366 and 368 under the suction action of fans 340 and 342.

In alternate embodiments, upper air plenums 316 and 318 and/or lower air plenum 320 and 322 may suitably be a single jet finger that has a length substantially along toasting/cooking passageway 314. Alternatively, any of upper air plenums 316 or 318 or lower air plenums 320 or 322 may be a plurality of jet fingers. Apertures 332 and/or apertures 338 may have any suitable shape depending on the type of cooking to be done.

Electrical heater assembly 312 includes at least one heater element 372 disposed in each lower manifold. For example, two heater elements 372 are so disposed below divider 345 in FIG. 16. Heater elements 372, may be any suitable electrical heater that boosts the temperature of the air stream to lower plenums 320 and 322 relative to the temperature of the air stream to the upper plenums 320 and 322. For example, electrical heaters 372 may be infrared or other electrical heaters. Placement of electrical heaters 372 below divider 345 augments the heat or thermal energy of the air stream so that the thermal energy delivered to the food product via lower air plenums 320 and 322 is greater than that delivered by upper air plenums 316 and 318. This decreases the cooking time, i.e., cooking device 300, like cooking devices 11, 200 and 260, have faster cooking times than conventional air impingement ovens. Also, heater elements 372 impart crunchiness to bread products.

Figure 17:
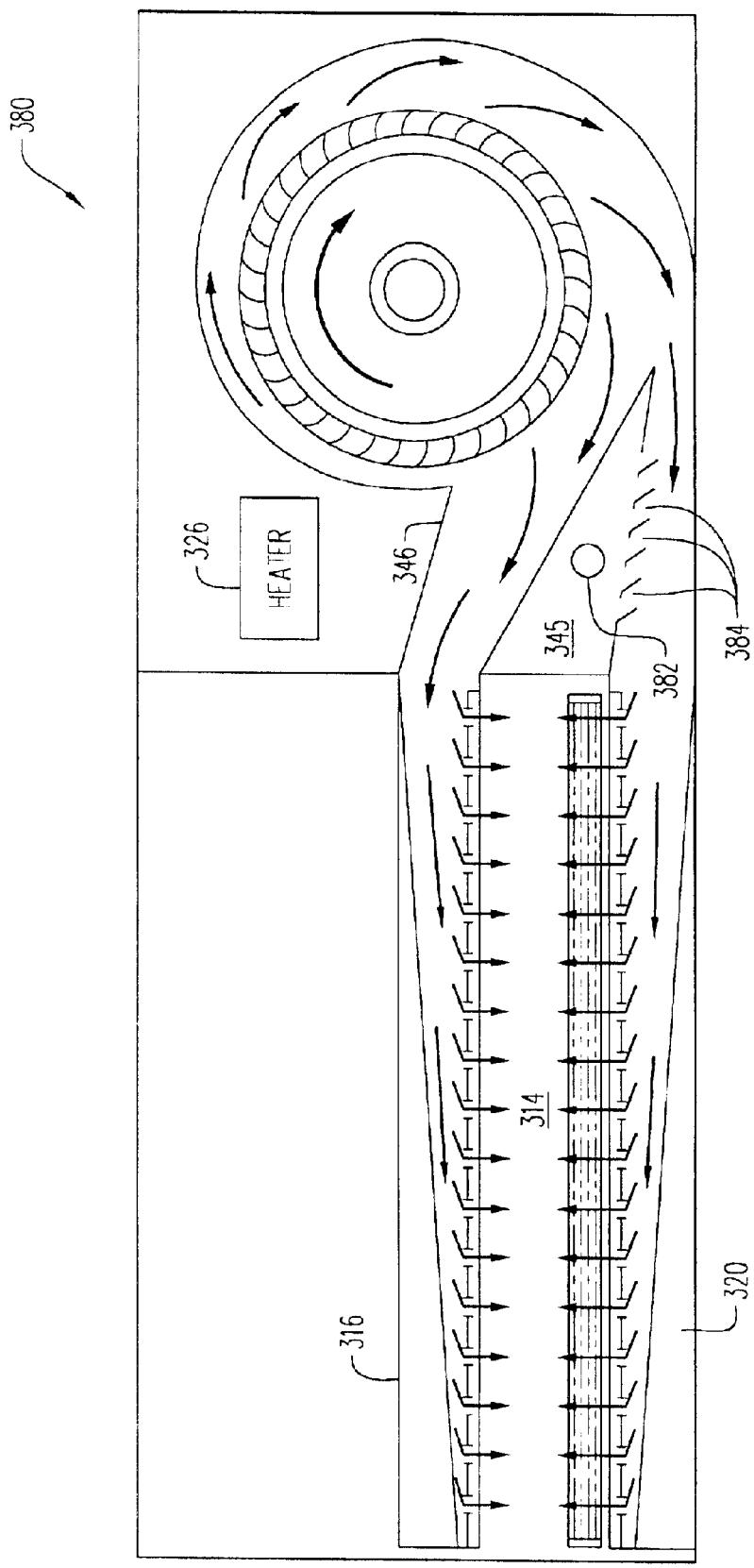
FIG. 17 is a view with side wall removed of another alternate embodiment of the high speed cooking device of the present invention.

Referring to FIG. 17, another alternate embodiment of the present invention is shown as a cooking device 380. Cooking device 380 is substantially similar to cooking device 300, except that cooking device 380 does not have electrical heater assembly 312. Instead, a gas burner 382 is disposed in divider 345 in a manner to direct more thermal heat toward lower air plenums 320 and 322 than to upper air plenums 316 and 318. To this end, a plurality of apertures or louvers 384 are disposed in the bottom side of divider 345 so as to allow the combustion flame to heat the air stream that is being diverted to lower plenums 320 and 322.

In an alternate embodiment, gas burner 382 can be relocated to heat the air stream in the lower part of fan housing 346 and divider 345 repositioned (for example, rotating the point counterclockwise in FIG. 16) to assure that this boosted heated air be diverted below the divider to lower air plenums 320 and 322.

In an alternate embodiment of cooking device 300 or 360, the air in the part of fan housing 346 above divider 345 can be cooled relative to the air stream to lower air plenums 320 and 322. In this embodiment, for example, the upper air stream can be cooled by adding cooler air into the area of fan housing above divider 345. This can augment or replace the electrical heater assembly 312 of cooking device 300 or the gas burner 382 of cooking device 380. The cooler air, for example, can be dilution air that is diverted from passageway 314.

Figure 18:
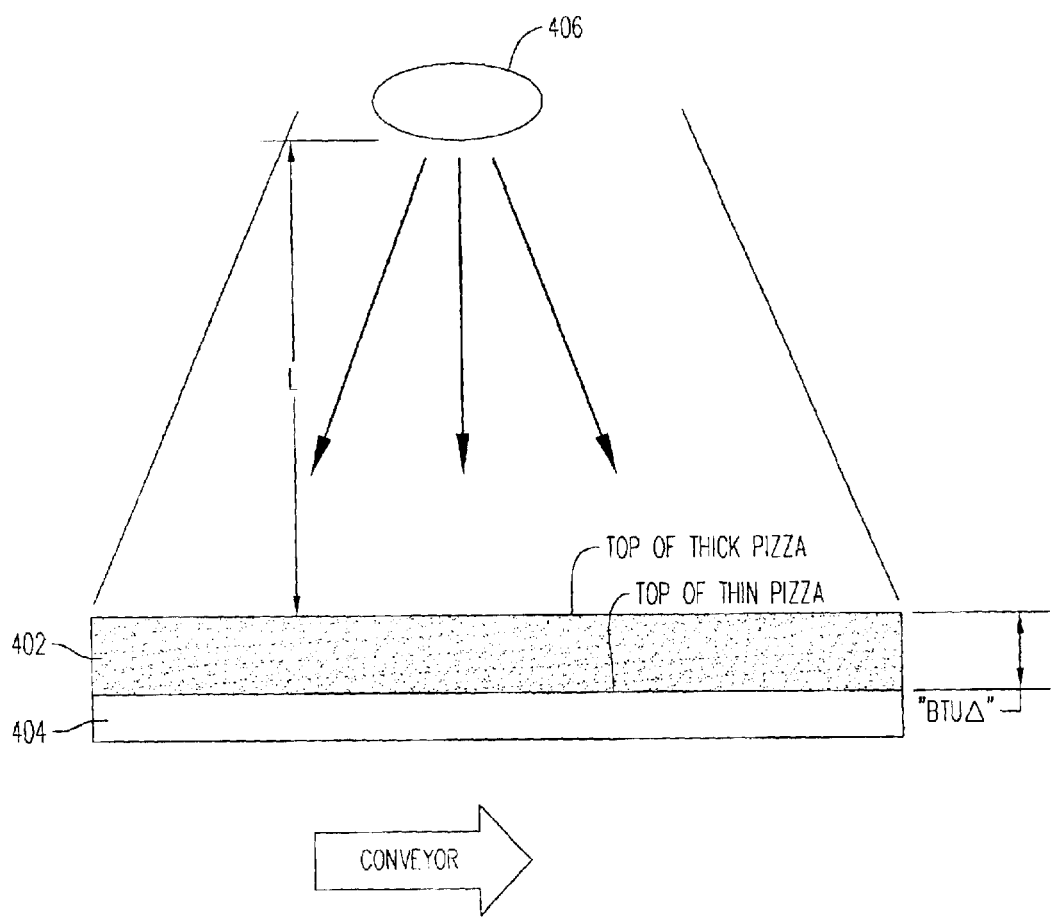
FIG. 18 is a diagram depicting BTU tuning range for some of the embodiments of the cooking device of the present invention.

Referring to FIG. 18, a thick food product 402 and a thin food product 404 have different heights. Thick food product 402 and thin food product 404 may be any food products that have different heights, such as bakery products, pizzas, meat, poultry or fish products, vegetables, and the like. Thick food product 402 and thin food product 404 are shown, by way of example, as a thick pizza 402 and a thin pizza 404. The difference between the two heights is represented as BTU Δ. The top of thick pizza 402 is shown as located a distance L from an air jet 406. The top of thin pizza 404 is below the top of thick pizza 402 by the distance BTU Δ.

When the distance L has been set in traditional ovens, thick pizza 402 and thin pizza 404 could be cooked only by making a change in the distance L, i.e., a vertical change in the position of the upper jet or conveyor. This resulted in a change in temperature that affected cooking times, thereby making a changeover time consuming and complicated.

It has been discovered that an array of jet apertures having particular cross-section shapes and spaced to provide overlapping jets can diffuse or plume to form a blanket of heated air at the food surface of the higher food product (thick pizza 402). The blanket permits thick pizza 402 and thin pizza 404 to be cooked when placed adjacent one another on the conveyor without adjusting the distance L.

The particular cross-sectional shapes provide a range of BTU delivery rates over the distance BTU Δ for a predetermined value of L. This range of BTU delivery rates assures that a higher BTU rate will completely cook thick pizza 402 without blowing toppings and that a lower BTU rate will cook thin pizza 404 without burning. The higher and lower BTU delivery rates will still deliver heated air at about the same temperature to both thick pizza 402 and thin pizza 404. The BTU delivery rates within the range can be adjusted for product height variations by adjustment of air pressure (e.g., mere adjustment of fan speed) without any adjustment to the distance L. This tuning allows tuning to delivery rates in the range that will cook thick pizza 402 completely and thin pizza 404 without burning.

Preferably, the cross-sectional shape includes at least one web like member that has at least one enlarged area along the length thereof. More preferably, the enlarged area is located at an end of the web like member. Even more preferably, there are enlarged portions at each end of the web like member, so as to form a dog bone shape. The enlarged portions serve to reduce velocity gradients along the length of the web like member.

Other preferred cross-sectional shapes include a plurality of web like members with enlarged portions at each end that intersect with one another to form a starburst shape. For the case where the number of web members is two, the shape is a jack. More preferably, the starburst and jack also include an additional enlarged portion at the midpoints of the web like members, i.e., at the crossing point.

This discovery will be described with reference to FIGS. 19-30 for thick pizza 402 and thin pizza 404 for an example in which L=3.937 inches and BTU Δ=0.625 inch.

Figure 19:
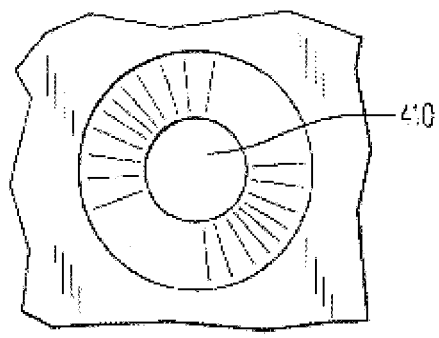
FIG. 19 is a cross-section view of a circular air jet aperture.
Figure 20:
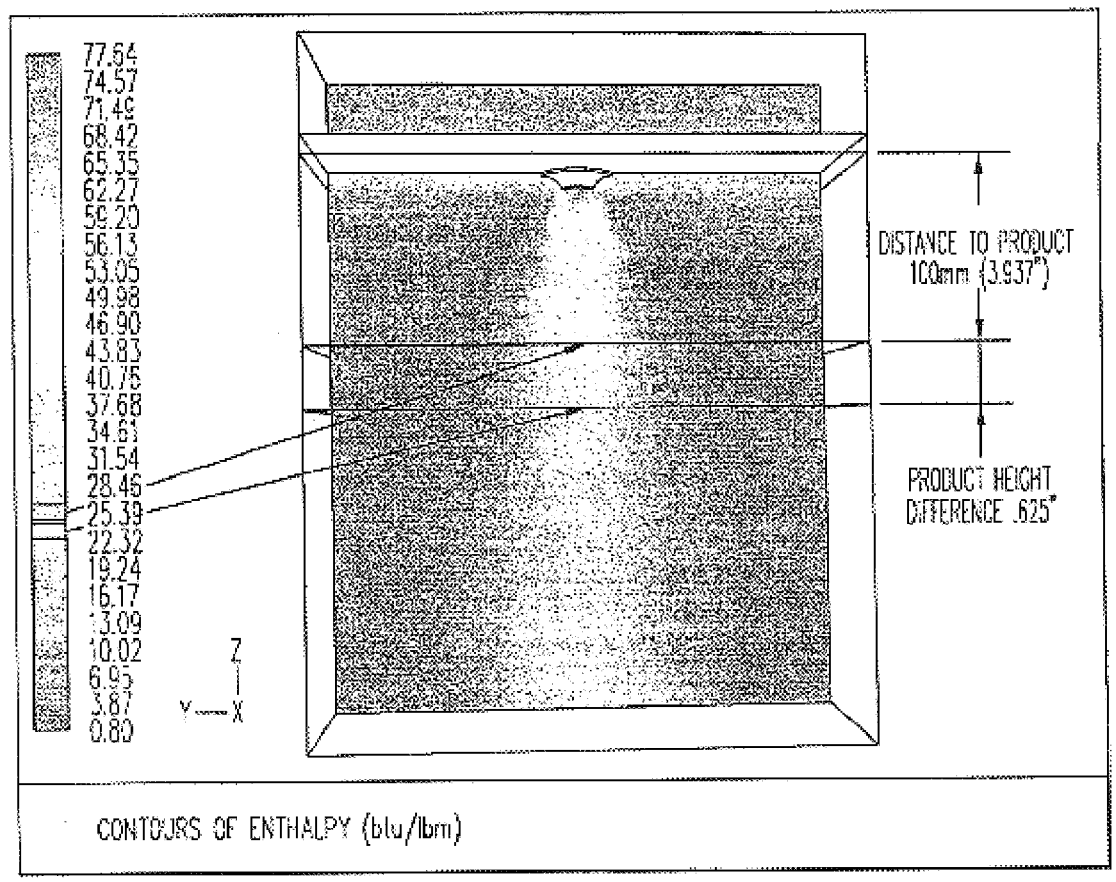
FIG. 20 is a heat trace depicting contours of enthalpy of the circular air jet aperture of FIG. 19.
Figure 21:
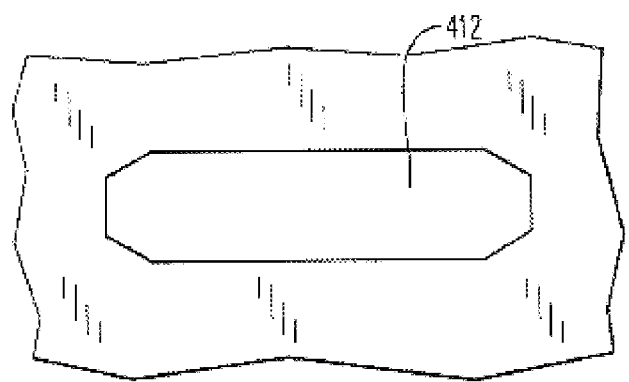
FIG. 21 is a cross-section view of a rectangular air jet aperture.

Referring to FIGS. 19-24, three jet apertures 410, 412 and 414 are depicted as having cross-sectional shapes that are circular, rectangular and cross, respectively. With reference to FIGS. 19 and 20, a heat trace for jet aperture 410 shows a very narrow range of BTU delivery rates to the tops of both thick pizza 402 and thin pizza 404 of about 24 to 25.39 BTU/lbm. These delivery rates are so close together that tuning requires a combination of changing fan speed, jet fingers, finger aperture plates, adding air straighteners in the fingers or block off plates to increase static pressure or modifying return air paths. For example, vertical adjustment of the distance L would be needed to cook thick pizza 402 and thin pizza 404.

Figure 22:
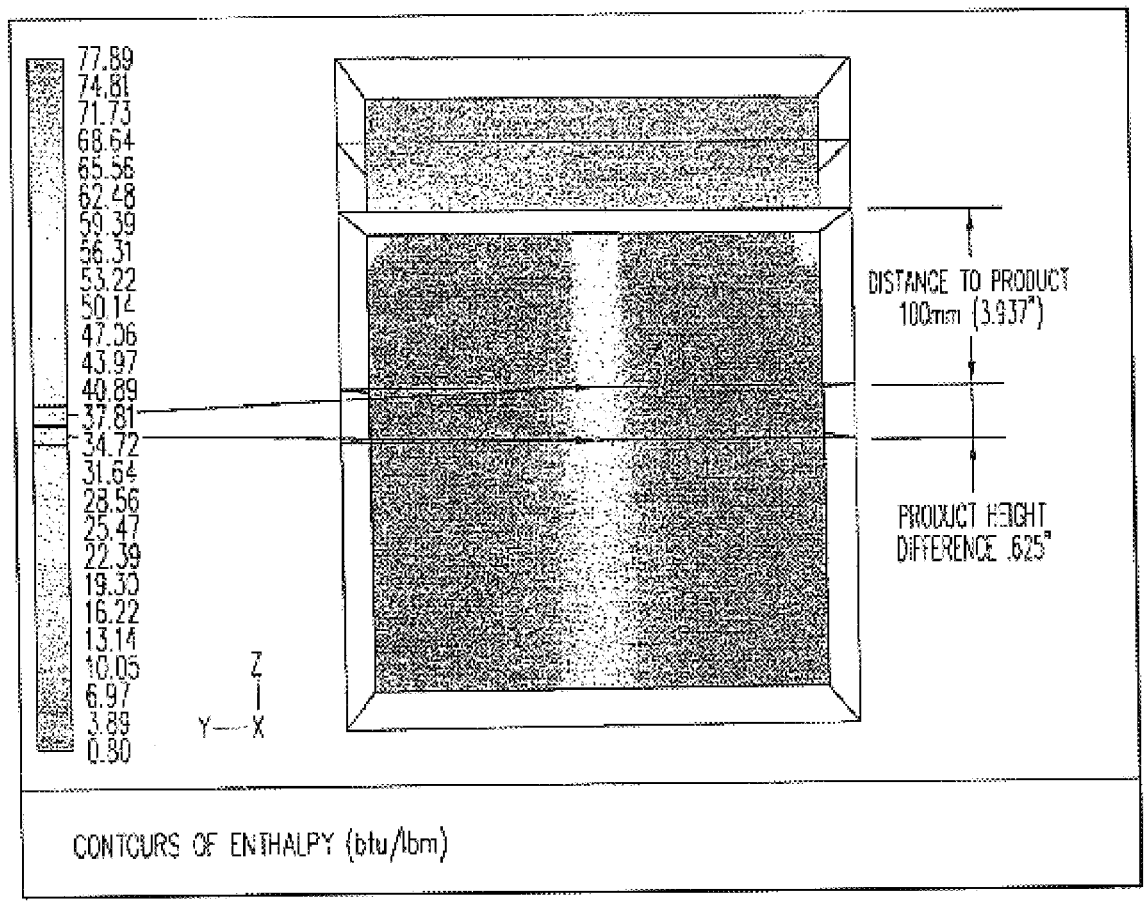
FIG. 22 is a heat trace depicting contours of enthalpy of the rectangular air jet aperture of FIG. 21.
Figure 23:
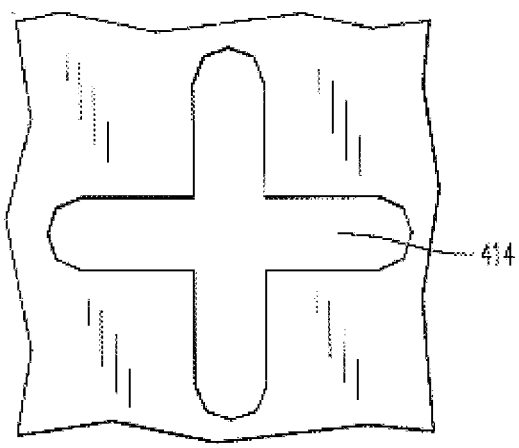
FIG. 23 is a cross-section view of a cross air jet aperture.
Figure 24:
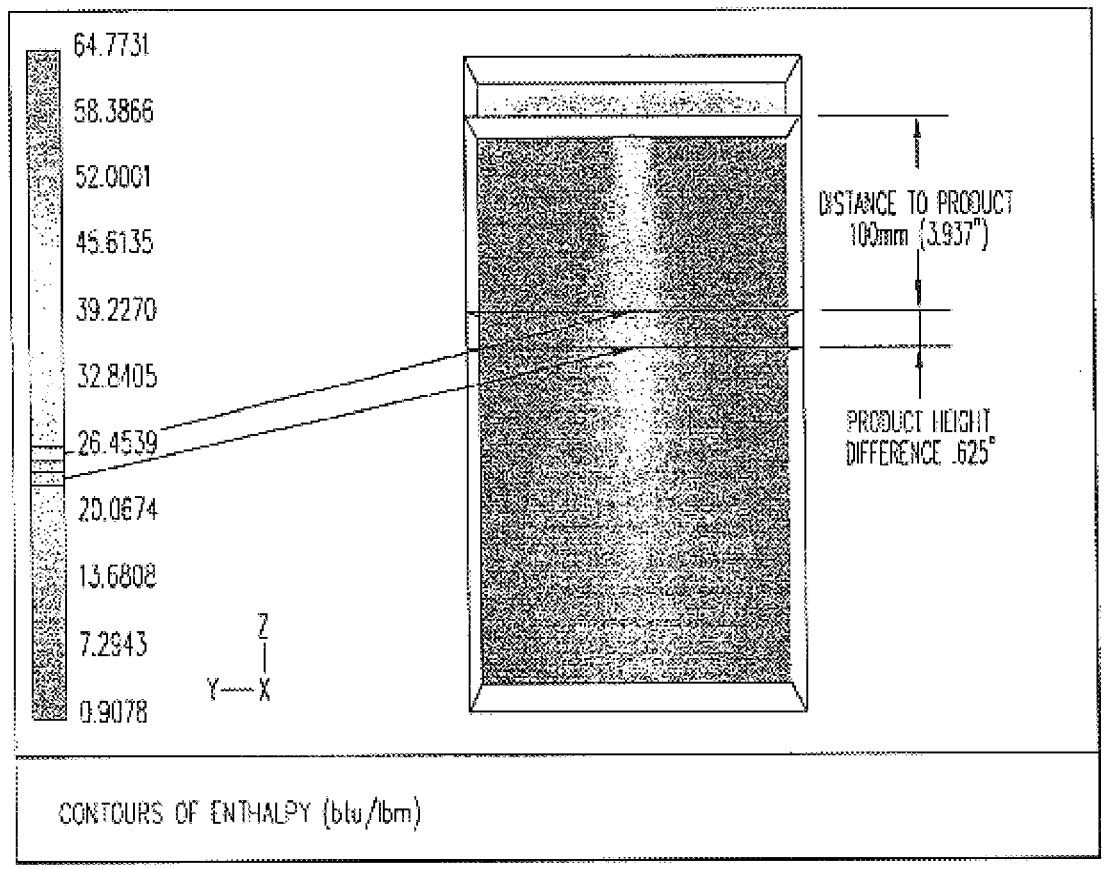
FIG. 24 is a heat trace depicting contours of enthalpy of the cross air jet aperture of FIG. 23.

Similarly, FIG. 22 shows a very narrow range of about 35 to 36 BTU/lbm for rectangularly shaped jet aperture 412 of FIG. 23. Also, FIG. 24 shows a very narrow range of about 23 to about 25 BTU/lbm for cross shaped jet aperture 412.

Jet apertures 410, 412 and 414 each have a noticeable drop in air velocity from the center toward circumference or the ends thereof. This means that as the food product travels across the aperture, the food product would receive unequal treatment of heat (i.e., BTU delivery rate). Also, the jet columns of air for jet apertures 412 and 414 are rather narrow and difficult to use to form a blanket of heated air at the top of the higher food product (i.e., thick pizza 402).

Figure 25:
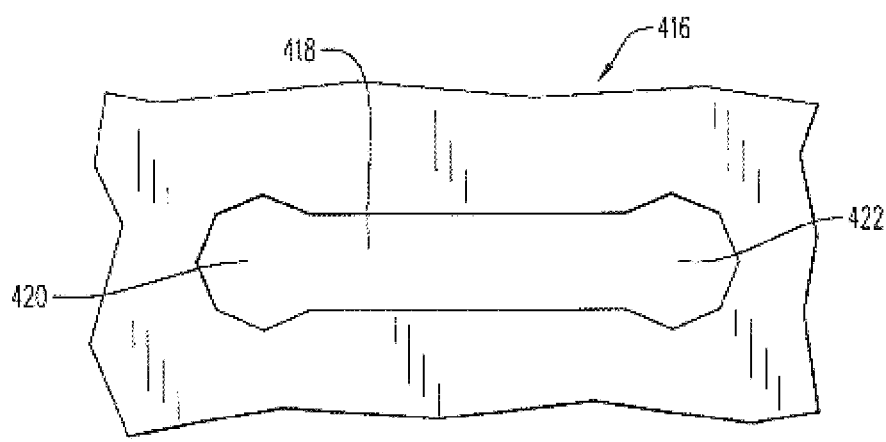
FIG. 25 is a cross-section view of a dog bone air jet aperture.

Referring to FIG. 25, a dog bone shaped jet aperture 416 includes a web like member 418 that has enlarged portions 420 and 422 disposed at either end thereof. The enlarged portions may have any suitable shape, including, but not limited to, circular, square, rectangle and polygonal. Enlarged portions 420 and 422 serve to reduce the velocity change along the length of web like member 418. This helps to assure a more uniform air velocity in the jet column of heated air formed by the dog bone jet aperture 416.

Figure 26:
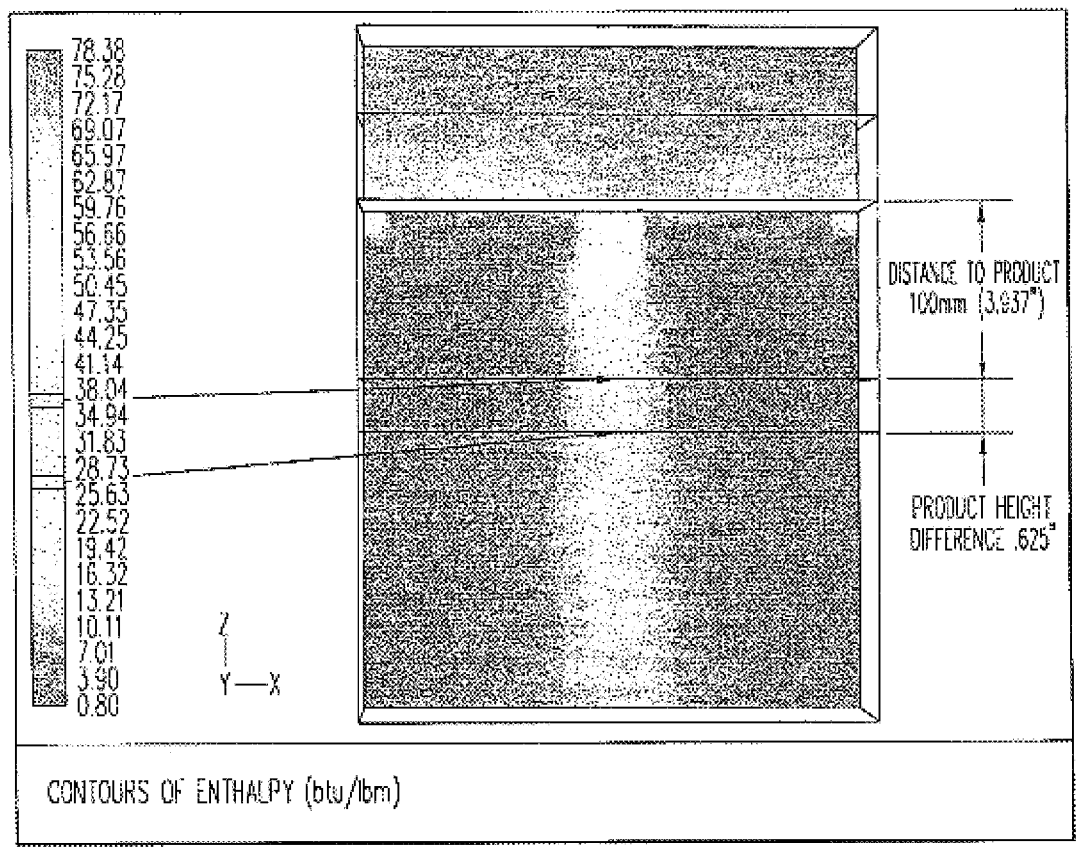
FIG. 26 is a heat trace depicting contours of enthalpy of the dog bone air jet aperture of FIG. 25.

Referring to FIG. 26, the heat trace for dog bone jet aperture 416 shows a rather constant temperature of the air jet column over a wide range of BTU delivery rates throughout the BTU Δ distance. Thus, the BTU delivery rate range is about 26 to about 36 BTU/lbm. This assures a large enough range to permit tuning of the delivery rate by simple adjustment of the air speed or fan speed so as to cook both thick pizza 402 and thin pizza 404 without adjustment of the distance L. That is, the BTU delivery rate can be tuned to a pair of values in the wide range that will cook both thick pizza 402 and thin pizza 404 without adjusting the distance L.

Figure 27:
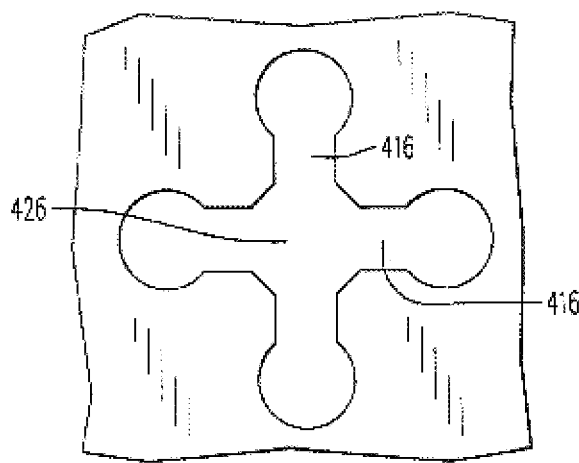
FIG. 27 is a cross-section view of a jack air jet aperture.

Referring to FIG. 27, a jack shaped jet aperture 424 includes a pair of web like members 416 arranged in crossing relationship that share another enlarged portion 426 located at the crossing point or the mid points of the two web like members. Similar to enlarged portions 420 and 422, enlarged portion 426 may have any suitable shape including, but not limited to, circular, square, rectangle and polygonal. Enlarged portions 420, 422 and 426 serve to reduce the velocity change along the length of web like member 418. This helps to assure a more uniform air velocity in the jet column of heated air formed by the jack jet aperture 416.

Figure 28:
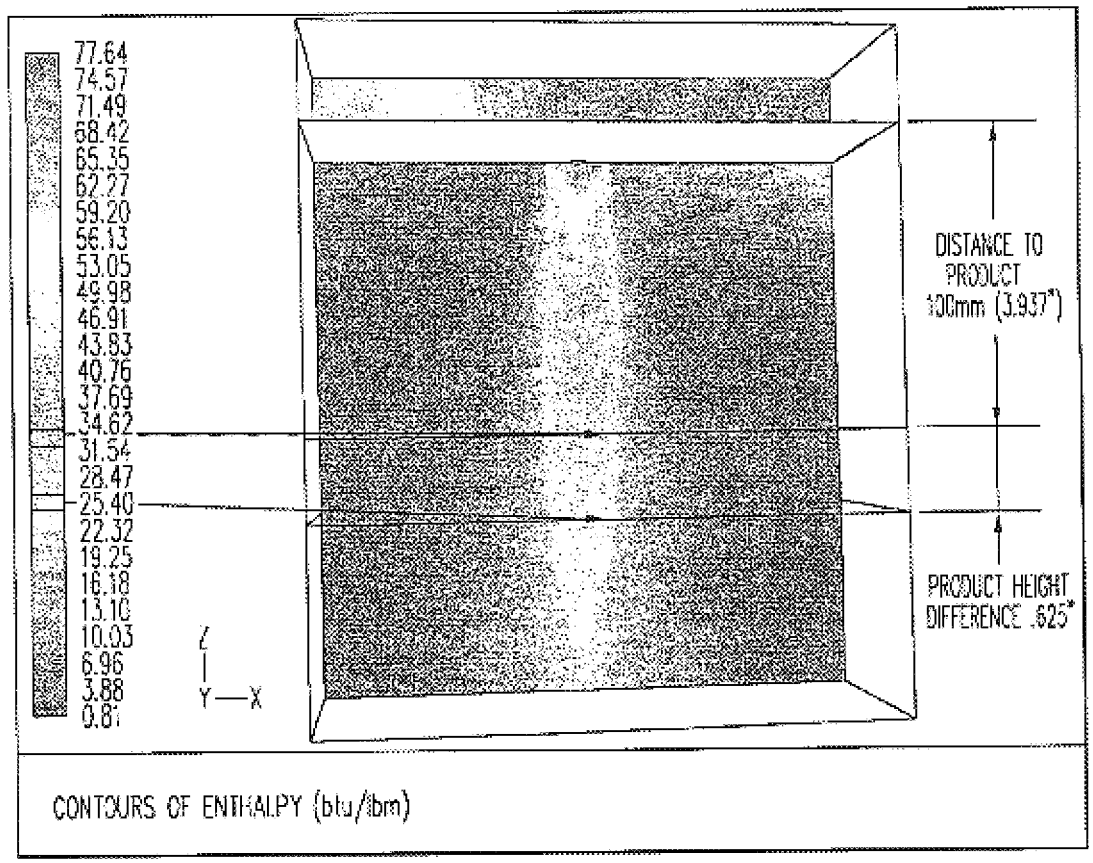
FIG. 28 is a heat trace depicting contours of enthalpy of the jack air jet aperture of FIG. 27.

Referring to FIG. 28, the heat trace for jack shaped jet aperture 424 shows a rather constant temperature of the air jet column over a wide range of BTU delivery rates throughout the BTU Δ distance. Thus, the BTU delivery rate range is about 25 to about 33 BTU/lbm. This assures a large enough range to permit tuning of the delivery rate by simple adjustment of the air speed or fan speed so as to cook both thick pizza 402 and thin pizza 404 without adjustment of the distance L. That is, the BTU delivery rate can be tuned to a pair of values in the wide range that will cook both thick pizza 402 and thin pizza 404 without adjusting the distance L.

Figure 29:
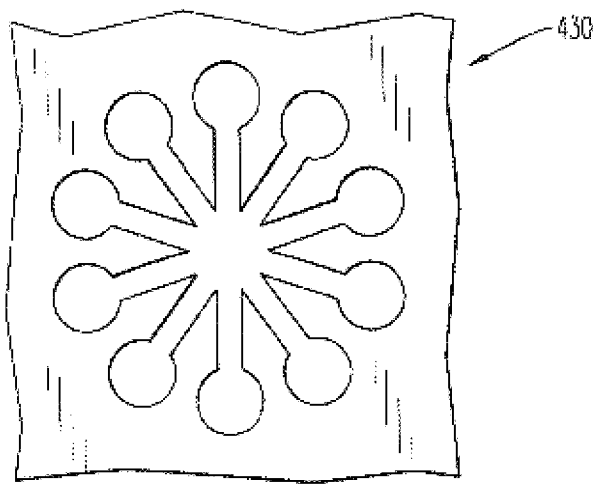
FIG. 29 is a cross-section view of a starburst air jet aperture.

Referring to FIG. 29, a starburst shaped jet aperture 430 is similar to jack shaped aperture 424, but includes more than a pair of dog bone shaped apertures 416 that are arranged in a crossing relationship with a central enlarged portion 426. This helps to assure a more uniform air velocity in the jet column of heated air formed by the star burst jet aperture 416.

Figure 30:
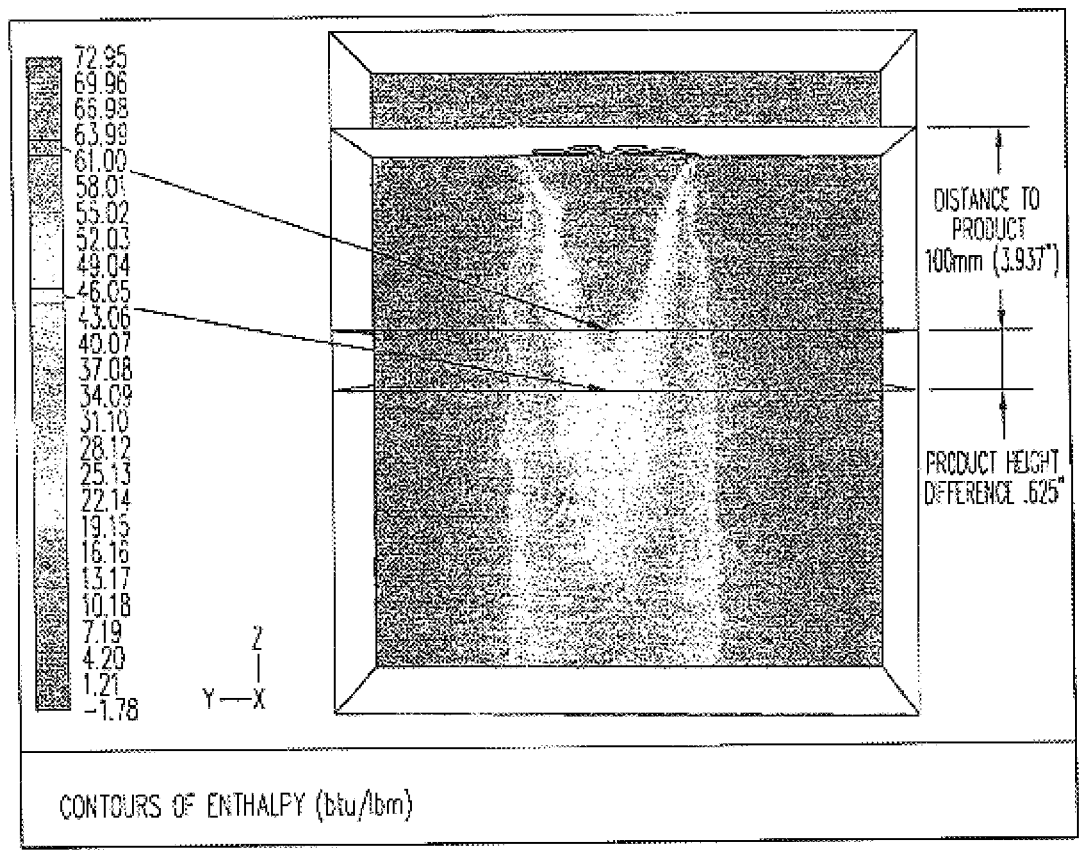
FIG. 30 is a heat trace depicting contours of enthalpy of the starburst air jet aperture of FIG. 29.

Referring to FIG. 30, the heat trace for star burst jet aperture 416 shows a rather constant temperature of the air jet column over a wide range of BTU delivery rates throughout the BTU Δ distance. Thus, the BTU delivery rate range is about 46 to about 62 BTU/lbm. This assures a large enough range to permit tuning of the delivery rate by simple adjustment of the air speed or fan speed so as to cook both thick pizza 402 and thin pizza 404 without adjustment of the distance L. That is, the BTU delivery rate can be tuned to a pair of values in the wide range that will cook both thick pizza 402 and thin pizza 404 without adjusting the distance L with the same cooking time or residence in the oven.

Also, the heat traces of FIGS. 26, 28 and 30 show that the jet columns of heated air are wide enough to allow flexibility to design a system that will form a blanket of heated air above thick pizza 402.

Figure 31:
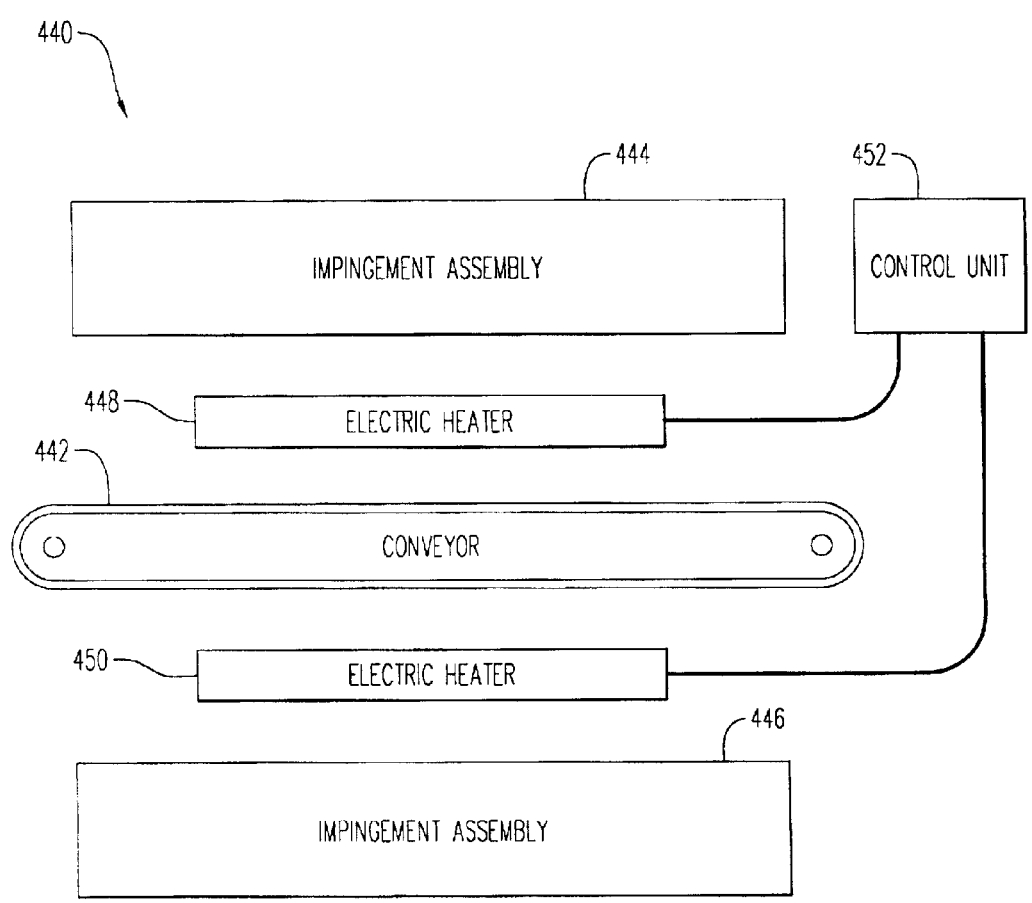
FIG. 31 is a diagram of alternate embodiment of the cooking device of the present invention.

Referring to FIG. 31, a cooking device 440 includes a conveyor 442, an upper impingement assembly 444 disposed above conveyor 442 and a lower impingement assembly 446 disposed below conveyor 442. Conveyor 442 is operable to convey food products (not shown) along the passageway between upper impingement assembly 442 and lower impingement assembly 446. Impingement assemblies 444 and 446 are operable to provide impingement air for cooking the food products being conveyed by conveyor 442. Impingement assemblies 444 and 448 may be implemented in any of the cooking devices 11 (FIGS. 1–9), 200 (FIGS. 11 and 12), 260 (FIG. 13), 300 (FIGS. 14–17) and 380 (FIG. 17) as well as in any impingement oven for cooking of food products.

An electric heater 448 is disposed above conveyor 442 and an electric heater 450 is disposed below conveyor 442. Electric heaters 448 and 450 may be any suitable electric heater and, preferably, are radiant heaters, such as infrared heaters. Electric heaters 448 and 450 preferably each have a heater element that weaves among the columns of impingement air in a manner that minimizes interference therewith, as shown, for example, in cooking device 200 of FIG. 12. Electric heaters 448 and 450 are shown as located between conveyor 442 and impingement assemblies 444 and 446. It will be apparent to those skilled in the art that electric heaters 448 and 450 may alternatively be located within impingement assemblies 444 and 446, respectively, as shown, for example, in FIGS. 13 and 16.

A control unit 452 is electrically connected to electrical heaters 448 and 450. Control unit 452 is operable to control electric heaters 448 to both be off, both be on, or one off and one on. For example, if electric heaters 448 and 450 are on and off, respectively, additional thermal energy is applied to the top of the food products, thereby imparting crunchiness thereto. On the other hand, if electric heaters 448 and 450 are off and on, respectively, additional thermal energy is applied to the bottom of the food products, thereby imparting crunchiness thereto. If both electrical heaters are on, crunchiness is imparted to both the top and bottom of the food products.

It will be apparent to those skilled in the art that control unit 452 can be given additional functionality to control the energy supplied to electrical heaters 448 and 450 in a programmed fashion for various cooking procedures. This gives cooking device 440 a great amount of flexibility. It will be further apparent to those skilled in the art that the principles of cooking device 440 may be implemented in any of the embodiments shown in FIGS. 1–30.

It will be apparent to those skilled in the art that the blanket and tuning features of the invention can be used in any of the cooking devices 11 (FIGS. 1–9), 200 (FIGS. 11 and 12), 260 (FIG. 13), 300 (FIGS. 14–17) and 380 (FIG. 17) as well as in any impingement oven for cooking of food products of varying heights on a single conveyor.

It will also be apparent to those skilled in the art that the ovens of the present invention achieve rapid cooking times by delivering different amounts of thermal energy to the top and bottom of the food product to match the maximum thermal absorption rate of the product being cooked. Air volumes, velocities, temperature and radiant emissions are selected to optimize thermal transfer to different thickness of product being cooked on the same conveyor belt set to the same cooking time.

The present invention having been thus described with particular reference to the preferred forms thereof, it will be obvious that various changes and modifications may be made therein without departing from the spirit and scope of the present invention as defined in the appended claims.

What is claimed is:

1. A cooking device which comprises: a heating assembly that provides thermal energy to a too and a bottom of one or more food products such that said thermal energy delivered to said bottom is greater than said thermal energy delivered to said too said heating assembly comprising a first air impingement assembly that provides upper columns of air to said top, a second air impingement assembly which provides lower columns of air to said bottom and an infrared heater that provides infrared heat directly to said bottom, wherein said infrared heater is disposed between said second air impingement assembly and said bottom.

2. The cooking device of claim 1, wherein said infrared heater includes a heater element that is disposed so as to weave about said lower columns of air without being directly within a path of said lower columns of air.

3. The cooking device of claim 2, wherein said second air impingement assembly includes a surface with a plurality of apertures through which said lower columns of air are delivered, and wherein said heater element does not overlie any of said apertures.

4. The cooking device of claim 3, wherein said first and second air impingement assemblies comprises an upper plenum assembly and a lower plenum assembly, respectively, that provide said upper and lower columns of air, respectively.

5. A cooking device which comprises: a heating assembly that provides thermal energy to a top and a bottom of one or more food products such that said thermal energy delivered to said bottom is greater than said thermal energy delivered to said top, said heating assembly comprising a first air impingement assembly that provides upper columns of air to said top, a second air impingement assembly which provides lower columns of air to said bottom and an infrared heater that provides infrared heat directly to said bottom, wherein said infrared heater is disposed inside said second air impingement assembly.

6. The cooking device of claim 5, wherein said infrared heater comprises a heater element that is disposed to weave about said lower columns of air without being directly within said lower columns of air.

7. The cooking device of claim 6, wherein said first air impingement assembly comprises an upper plenum that is disposed to provide said upper columns of air and said second air impingement assembly comprises a lower plenum that is disposed to provide said lower columns of air, and wherein said heater element is disposed in said lower plenum.

8. A cooking device which comprises: a heating assembly that provides thermal energy to a top and a bottom of one or more food products such that said thermal energy delivered to said bottom is greater than said thermal energy delivered to said top, said heating assembly comprising a first air impingement assembly that provides upper columns of air to said top, a second air impingement assembly which provides lower columns of air to said bottom, an additional heater that heats the air that forms said upper and lower columns of air and an infrared heater that provides infrared heat directly to said bottom and that is disposed with respect to said lower columns of air so that said infrared heat and said lower columns of air are provided co-extensively to said bottom, and wherein said heating assembly provides a circulating air stream that is heated by said additional heater and is divided into a first path that includes said upper columns of air and into a second path that includes said lower columns of air, and wherein said infrared heater boosts the temperature of said circulating air stream in said second path above the temperature of said circulating air stream in said first path.

9. The cooking device of claim 8, wherein a location of said infrared heater is selected from the group consisting of: between said second air impingement assembly and said bottom, inside said second air impingement assembly and between said second air impingement assembly and said additional heater.

10. The cooking device of claim 8, wherein said heating assembly further comprises a fan assembly disposed in said circulating air stream, and wherein said infrared heater is disposed in said fan assembly.

11. The cooking device of claim 8, wherein said means for delivering further comprises a divider that divides said circulating air stream into said first and second paths, and wherein said infrared heater is disposed relative to said divider to boost said temperature of said circulating air stream in said second path.

12. The cooking device of claim 11, wherein said infrared heater is disposed in said second path.

13. The cooking device of claim 11, wherein said infrared heater is disposed within said divider, and wherein said divider includes a heat transfer communication with said second path.

14. The cooking device of claim 13, wherein said heat transfer communication includes one or more louvers that open toward said second path.

15. The cooking device of claim 14, wherein said infrared heater is a gas heater.

16. A cooking device which comprises: a heating assembly that provides thermal energy to a too and a bottom of one or more food products such that said thermal energy delivered to said bottom is greater than said thermal energy delivered to said top, said heating assembly comprising a first air impingement assembly that provides upper columns of air to said top, a second air impingement assembly which provides lower columns of air to said bottom, an infrared heater that provides infrared heat directly to said bottom and a cooling assembly that cools the air that forms said upper columns of air.

17. A cooking device which comprises: a heating assembly that provides thermal energy to a top and a bottom of one or more food products such that said thermal energy delivered to said bottom is greater than said thermal energy delivered to said top, said heating assembly comprising a first air impingement assembly that provides upper columns of air to said top, a second air impingement assembly which provides lower columns of air to said bottom and an infrared heater that provides infrared heat directly to said bottom, and wherein said heating assembly further comprises a temperature adjuster that alters the temperature of one of said upper and said lower columns of air.

18. The cooking device of claim 17, wherein said temperature adjuster is selected from the group consisting of: boosting the temperature of said lower columns of air, cooling the temperature of said upper columns of air and a combination thereof.

19. A cooking device which comprises: a heating assembly that provides thermal energy to a top and a bottom of one or more food products such that said thermal energy delivered to said bottom is greater than said thermal energy delivered to said top, said heating assembly comprising a first air impingement assembly that provides upper columns of air to said top, a second air impingement assembly which provides lower columns of air to said bottom and an infrared heater that provides infrared heat directly to said bottom, wherein at least one of said upper columns and lower columns of air diffuse to form a blanket of impingement air on said respective top or bottom, wherein at least one of said first and second air impingement assemblies comprises a plurality of apertures shaped to provide said blanket of impingement air, and wherein said apertures have a cross-section shape which provides different BTU delivery rates at different levels within said blanket of impingement air.

20. The cooking device of claim 19, wherein said plurality of apertures has a shape that is selected from the group consisting of rectangular and cruciform.

21. The cooking device of claim 19, wherein said cross-section is selected from the group consisting of: dog bone, jack and starburst.

22. The cooking device of claim 21, wherein said cross-section has one or more enlarged portions located at a position selected from the group consisting of: end, center and a combination thereof.

23. The cooking device of claim 22, wherein said enlarged portion is generally circular.

24. A cooking device which comprises: a heating assembly that provides thermal energy to a top and a bottom of one or more food products such that said thermal energy delivered to said bottom is greater than said thermal energy delivered to said top, said heating assembly comprising a first air impingement assembly that provides upper columns of air to said top, an additional heater that heats the air that forms said upper and lower columns of air, and an infrared heater that provides infrared heat directly to said bottom and that is disposed with respect to said lower columns of air so that said infrared heat and said lower columns of air are provided co-extensively to said bottom, wherein said upper columns of air diffuse to form a blanket of upper impingement air on said top, wherein said first air impingement assembly comprises a plurality of apertures shaped to provide said blanket of impingement air, and wherein said apertures have a cross-section shape which provides different BTU delivery rates at different levels within said blanket of impingement air.

25. The cooking device of claim 24, wherein said plurality of apertures has a shape that is selected from the group consisting of rectangular and cruciform.

26. The cooking device of claim 24, wherein said cross-section is selected from the group consisting of: dog bone, jack and starburst.

27. The cooking device of claim 24, wherein said cross-section has one or more enlarged portions located at a position selected from the group consisting of: end, center and a combination thereof.

28. The cooking device of claim 24, wherein said enlarged portion is generally circular.

29. A method for cooking one or more food products comprising:
   a) providing a stream of air that is applied as columns of heated air to a top of said food product and providing infrared heat directly to a bottom of said food product; and
   b) controlling the thermal energy applied to said top and bottom of said food product so that the thermal energy applied to said bottom is greater than that applied to said top, wherein step (b) cools at least a portion of said stream of heated air.

30. The method of claim 29, wherein step (a) applies said stream of air as upper and lower columns of heated air to said top and bottom of said food product, respectively, and wherein said infrared heat and said lower columns of air are provided co-extensively to said bottom.

31. The method of claim 30, wherein step (b) controls said heated air stream so that said lower columns are warmer than said upper columns.

32. The method of claim 29, wherein said upper columns of heated air diffuse to form a blanket of impingement air to said top of said food product.

33. The method of claim 29, wherein said columns of air are provided via a plurality of apertures, each of said apertures having a cross-section selected from the group consisting of: dog bone, jack and starburst.

34. The method of claim 29, wherein said columns of air are provided via a plurality of apertures mutually spaced and shaped to provide a blanket of impingement air to said top of said food product.

35. A method for cooking one or more food products comprising:
a) providing a stream of air that is applied via a plurality of apertures as columns of heated air to a top of said food product and providing heat to a bottom of said food product; and
b) controlling the thermal energy applied to said top and bottom of said food product so that the thermal energy applied to said bottom is greater than that applied to said top, wherein said apertures have a cross-section shape which provides different BTU delivery rates at different levels within a blanket of impingement air formed by said columns of air.

36. The method of claim 35, wherein said cross-section is selected from the group consisting of: dog bone, jack and starburst.

37. The method of claim 35, wherein step (a) provides said columns of heated air to said food product in a cooking zone, and wherein said cooking zone is set to a predetermined temperature.

38. A cooking device comprising means that includes a plurality of jet apertures for providing columns of impingement air that form a blanket of impingement air for cooking food products of different heights without adjustment of the distance between said jet apertures and said food products, and wherein said et apertures have a cross-section shape which provides different BTU delivery rates at different levels within said blanket of impingement air.

39. The device of claim 38, wherein said food products of different heights are cooked in substantially identical cooking times.

40. The cooking device of claim 38, wherein said cross-section is selected from the group consisting of: dog bone, jack and starburst.

41. The cooking device of claim 38, wherein said cross-section has at least one elongated member with one or more enlarged portions located at a position selected from the group consisting of: end, center and a combination thereof.

42. The cooking device of claim 38, wherein said columns of impingement air are directed toward said food products from a direction selected from the group consisting of: above, below and above and below.

43. The cooking device of claim 38, further comprising a temperature adjuster that controls the thermal energy applied to a top and a bottom of said food products with a capability of applying a balanced or unbalanced thermal energy thereto.

44. The cooking device of claim 38, further comprising a temperature adjuster that controls the thermal energy applied to said food products so that a greater thermal energy is applied to a bottom than to a top thereof.

45. The cooking device of claim 38, further comprising a temperature adjuster that controls the thermal energy applied to said food products so that a greater thermal energy is applied to a top than to a bottom thereof.

46. The cooking device of claim 38, wherein said impingement columns include upper columns and lower columns of impingement air that are directed toward said food products from above and below said food products, respectively.

47. The cooking device of claim 38, wherein said food products of different heights are cooked in substantially identical cooking times.

48. The cooking device of claim 38, wherein said cross-section has at least one elongated member with one or more enlarged portions located at a position selected from the group consisting of: end, center and a combination thereof.

49. The cooking device of claim 46, further comprising a conveyor for moving said food products through said blanket of impingement air.

50. The cooking device of claim 38, further comprising one or more radiant heaters disposed to provide heat to said food products.

51. The cooking device of claim 50, wherein at least one of said radiant heaters is disposed on one side of said food products and said columns of impingement air are directed to the opposite side thereof.

52. The cooking device of claim 50, wherein first and second ones of said radiant heaters are disposed on opposite sides of said food products, and further comprising for a control that selectively controls on/off states thereof by selecting a state from the group consisting of: both on, both off and one on and the other off.

53. The cooking device of claim 50, wherein at least one of said radiant heaters is located so as to have minimal interference with said columns of impingement air.

54. A method for cooking food products of different heights comprising: providing columns of impingement air via jet apertures that form a blanket of impingement air for cooking said food products of different heights without adjustment of the distance between said jet apertures and said food products, and wherein said jet apertures have a cross-section shape which provides different BTU delivery rates at different levels within said blanket of impingement air.

55. The method of claim 54, wherein said food products of different heights are cooked in substantially identical cooking times.

56. The method of claim 54, wherein said cross-section is selected from the group consisting of: dog bone, jack and starburst.

57. The method of claim 54, wherein said cross-section has at least one elongated member with one or more enlarged portions located at a position selected from the group consisting of: end, center and a combination thereof.

58. The method of claim 54, wherein said columns of impingement air are directed toward said food products from a direction selected from the group consisting of: above, below and above and below.

59. The method of claim 54, further comprising the step of controlling the thermal energy applied to a top and a bottom of said food products with a capability of applying a balanced or unbalanced thermal energy thereto.

60. A cooking device comprising:

a conveyor for conveying food products to be cooked;

an upper air impingement assembly disposed above said conveyor and having a plurality of jet apertures that form upper columns of heated impingement air to cook said food products;

a lower air impingement assembly disposed below said conveyor and having a plurality of jet apertures that form lower columns of heated impingement air to cook said food products;

an upper radiant heater and a lower radiant heater disposed above and below said conveyor, respectively; and a control that selectively controls on/off states of said upper and lower radiant heaters.

61. The cooking device of claim 60, wherein said on/off states are selected from the group consisting of: both on, both off and one on and the other off.

62. The cooking device of claim 60, wherein said jet apertures of said upper impingement assembly are disposed and shaped to provide a blanket of impingement air to said food products.

63. The cooking device of claim 60, wherein said jet apertures of said upper impingement assembly are disposed and shaped to provide a blanket of impingement air to cook said food products that have different heights without adjusting a distance between said food products and said jet apertures of the upper impingement assembly.

* * * * *